(12) United States Patent
Kushiyama et al.

(10) Patent No.: US 8,867,868 B2
(45) Date of Patent: Oct. 21, 2014

(54) SEMICONDUCTOR INTEGRATED CIRCUIT

(75) Inventors: Natsuki Kushiyama, Kawasaki (JP); Yukihiro Urakawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1469 days.

(21) Appl. No.: 11/906,725

(22) Filed: Oct. 3, 2007

(65) Prior Publication Data

US 2008/0080809 A1   Apr. 3, 2008

(30) Foreign Application Priority Data

Oct. 3, 2006 (JP) .................. 2006-272087
Oct. 3, 2006 (JP) .................. 2006-272088

(51) Int. Cl.
- *G02B 6/30* (2006.01)
- *G02B 6/43* (2006.01)
- *G02B 6/12* (2006.01)
- *G06F 1/10* (2006.01)

(52) U.S. Cl.
CPC .............. *G02B 6/43* (2013.01); *G02B 6/12002* (2013.01); *G06F 1/105* (2013.01)
USPC ............................................. 385/14; 385/49

(58) Field of Classification Search
None
See application file for complete search history.

(56) References Cited

U.S. PATENT DOCUMENTS

| | | | |
|---|---|---|---|
| 7,457,491 B2 * | 11/2008 | Chen et al. | 385/14 |
| 2002/0039464 A1 * | 4/2002 | Yoshimura et al. | 385/14 |
| 2009/0016671 A1 * | 1/2009 | Asai et al. | 385/14 |
| 2009/0080830 A1 * | 3/2009 | Matsuoka et al. | 385/14 |

FOREIGN PATENT DOCUMENTS

| | | |
|---|---|---|
| JP | 5218384 | 8/1993 |
| JP | 6045584 | 2/1994 |
| JP | 8186541 | 7/1996 |
| JP | 2001-237411 A | 2/2000 |
| JP | 2002540451 | 11/2002 |
| JP | 2003-8054 | 1/2003 |

* cited by examiner

*Primary Examiner* — Hemang Sanghavi
(74) *Attorney, Agent, or Firm* — Sprinkle IP Law Group

(57) ABSTRACT

A semiconductor integrated circuit according to an example of the present invention includes a chip substrate, first and second switches arranged on the chip substrate in which ON/OFF of an electrical signal path is directly controlled by an optical signal, a first light shielding layer arranged above the chip substrate, an optical waveguide layer arranged on the first light shielding layer, a second light shielding layer arranged on the optical waveguide layer, a reflecting plate arranged in the optical waveguide layer to change an advancing direction of the optical signal, and means for leading the optical signal to the first and second switches from an inside of the optical waveguide layer. The first and second light shielding layers reflect the optical signal, and the optical waveguide layer transmits the optical signal radially.

14 Claims, 17 Drawing Sheets

⇒ Light passing through second optical waveguide surface
⇒ Light passing through first optical waveguide surface
— Metal line ⇒ Light passing through second optical waveguide surface
⇒ Light passing through first optical waveguide surface
— Metal line ☐ Flip-flop
⇒ Light passing through optical waveguide surface ☐ Flip-flop
⇒ Light passing through optical waveguide surface ☐ Flip-flop
⇒ Light passing through optical waveguide surface

SEMICONDUCTOR INTEGRATED CIRCUIT

CROSS-REFERENCE TO RELATED APPLICATIONS

This application is based upon and claims the benefit of priority from prior Japanese Patent Applications No. 2006-272087, filed Oct. 3, 2006; and No. 2006-272088, filed Oct. 3, 2006, the entire contents of both of which are incorporated herein by reference.

BACKGROUND OF THE INVENTION

1. Field of the Invention

The present invention relates to a semiconductor integrated circuit having an optical waveguide layer.

2. Description of the Related Art

The semiconductor integrated circuit in recent years has a tendency to further enlarge a circuit size mounted on a chip for obtaining multi-functions, and as a result, the chip area keeps increasing. With this, for instance, at the respective portions on the chip, it becomes difficult to match arrival time of a clock, that is, to match phases.

Accordingly, an idea of transmitting signals such as clock or data with a light has been proposed, and investigation is now proceeding.

One of the techniques to transmit signals with light uses a line-shaped optical waveguide path. However, in this case, since it is not possible to make width of the optical waveguide path smaller than wavelength of the light, there is a problem that it is difficult to form the optical waveguide path minutely in accordance with miniaturization of elements.

Further, another technique to transmit signals with light is to transmit the signals using an optical waveguide surface (for instance, Jpn. Pat. Appln. KOKAI Publication No. 2001-237411).

Using the optical waveguide surface can solve the problems occurring in the optical waveguide path. However, since the speed of light is not infinite, like the case of electrical signals, when distances from the light source to respective portions on the chip differ, it becomes difficult to match arrival times of the signals at respective portions on the chip.

Further, even though the signal is transmitted with light, elements receiving the signal necessitate photoelectric conversion element operating by electricity, and further necessitate local conductive wire to lead the signal converted to the electricity from the light to the element. For this reason, chip layout is complicated, and chip area increases.

Therefore, in order to more practically realize the technique for transmitting the signals by the optical waveguide surface, new technical development to substantially reduce timing skew of the signals at respective portions on the chip is essential.

BRIEF SUMMARY OF THE INVENTION

A semiconductor integrated circuit according to an aspect of the present invention comprises a chip substrate, first and second switches arranged on the chip substrate in which ON/OFF of an electrical signal path is directly controlled by an optical signal, a first light shielding layer arranged above the chip substrate, an optical waveguide layer arranged on the first light shielding layer, a second light shielding layer arranged on the optical waveguide layer, a reflecting plate arranged in the optical waveguide layer to change an advancing direction of the optical signal, and means for leading the optical signal to the first and second switches from an inside of the optical waveguide layer. The first and second light shielding layers reflect the optical signal, and the optical waveguide layer transmits the optical signal radially.

DETAILED DESCRIPTION OF THE INVENTION

A semiconductor integrated circuit of an aspect of the present invention will be described below in detail with reference to the accompanying drawings.

1. Outline

In an example of the present invention, adopted is a constitution in which, firstly, a plurality of optical waveguide surfaces (optical waveguide layer) are stacked, the respective optical waveguide surfaces are connected by a vertical hole, and a light can move to different optical waveguide surface only through the vertical hole. Herewith, there is prepared a three-dimensional low skew tree structure, so that timing skew of signals at the respective portions on the chip is substantially reduced.

Further, the example of the present invention constitutes a logic circuit such as flip-flop while using a switch element capable of directly controlling ON/OFF of the electrical signal path by an optical signal. Herewith, the photoelectric conversion element, and further the local conductive wire are made unnecessary, so that simplification of the chip layout and reduction of chip area are achieved.

2. Embodiments

Some embodiments believed to be the best will be described.

(1) First Embodiment

A. Reference Example

Firstly, there will be described an example of the semiconductor integrated circuit transmitting signals using the optical waveguide surfaces (optical waveguide layer).

Figure 1:
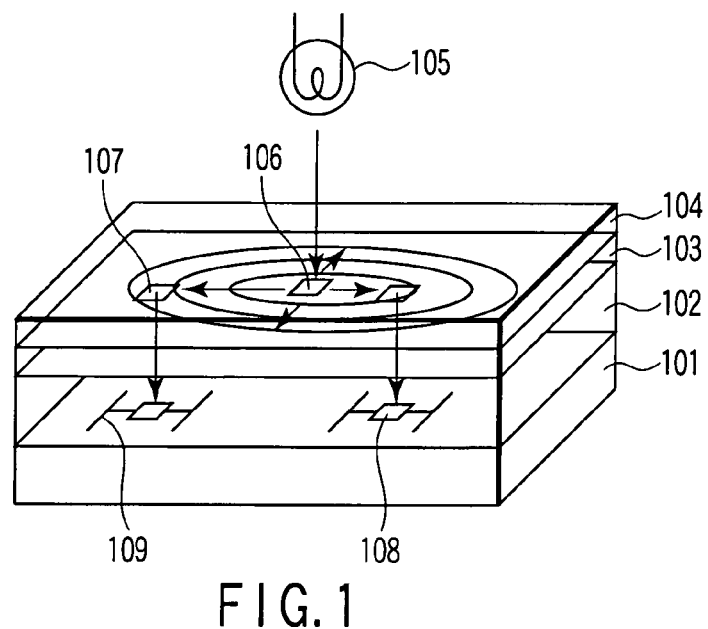
FIG. 1 is a cubic diagram showing a semiconductor integrated circuit as a reference example.
Figure 2:
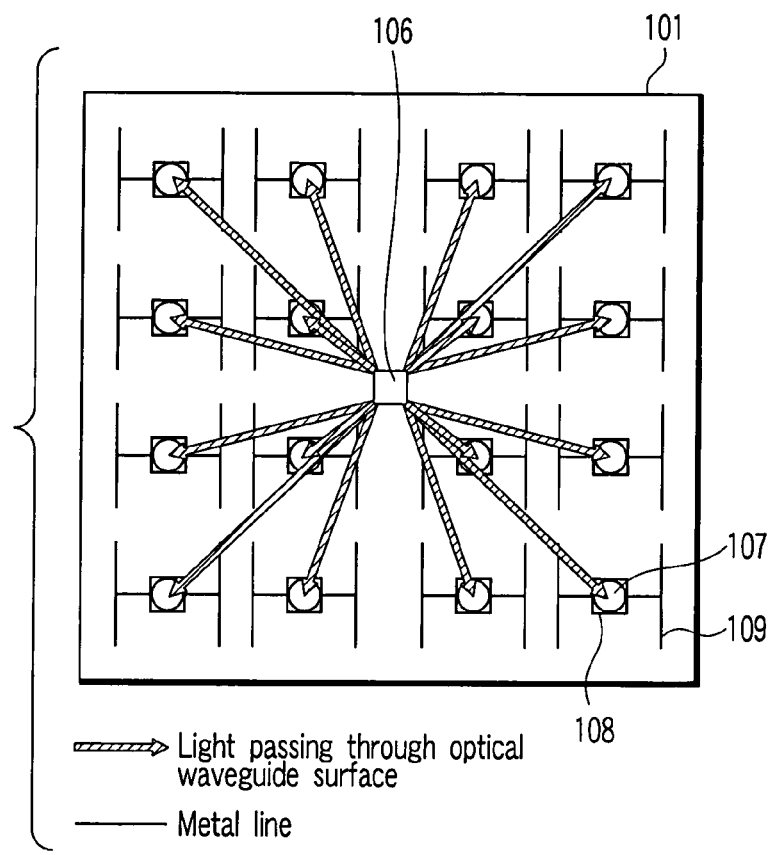
FIG. 2 is a plan view of the semiconductor integrated circuit of FIG. 1.

FIG. 1 shows an optical clock semiconductor integrated circuit. FIG. 2 is a plan view in which the semiconductor integrated circuit of FIG. 1 is viewed from light source side.

A light shielding layer 102 having a function for shielding light is arranged on a metal layer as an uppermost layer of a chip substrate 101. An optical waveguide layer 103 by which the optical clock is propagated radially in a surface is arranged on the light shielding layer 102. A light shielding layer 104 having a function for shielding light is further arranged on the optical waveguide layer 103.

A light incident hole 106 is bored at approximate center of the light shielding layer 104. A light source 105 is arranged above the light incident hole 106. The light source 105 expresses "H"/"L" of the clock by flickering.

The optical clock incident from the light incident hole 106, whose advancing direction is bent at a right angle, advances therefrom radially inside the optical waveguide layer 103 toward edges of the chip substrate 101.

A number of light emission holes 107 are bored on the light shielding layer 102, and photoelectric conversion element (light→electricity)/local clock drivers 108 are arranged immediately beneath them. At these points, the optical clock which is subjected to photoelectric conversion becomes the clock as an electrical signal.

The clock as the electrical signal is transmitted to the logic circuit such as flip-flop, via, for instance, a local clock line 109 constituted from a metal layer.

The local clock line 109 has, for instance, an H-tree structure in order to reduce the clock skew in the respective portions on the chip.

A characteristic of such semiconductor integrated circuit lies in a point that the optical clock is transmitted using the optical waveguide layer (optical waveguide surface) 103.

However, although the speed of light is ultrahigh, it is finite, and accordingly, the optical clock arrives at the light emission hole 107 close to the light incident hole 106 earlier than at the light emission hole 107 which is distant from the light incident hole 106.

Therefore, even though the local clock line 109 extending from the photoelectric conversion element/local clock driver 108 immediately beneath the light emission hole 107 has the H-tree structure, since the skew is already generated at the time point the optical clock arrives at the photoelectric conversion element/local clock driver 108, it is not possible to eliminate the clock skews at the respective portions on the chip.

Further, the optical waveguide path of the H-tree structure can also be formed without using the optical waveguide layer (optical waveguide surface) 103; however, in this case, since width of the optical waveguide path cannot be made smaller than wavelength of the light, it is not possible to cope with miniaturization of the element.

B. Fundamental Structure

In the first embodiment, a three-dimensional low skew tree structure is proposed in which a plurality of optical waveguide surfaces (optical waveguide layer) are stacked, the respective optical waveguide surfaces are connected by a vertical hole, and a light can move to different optical waveguide surface only through the vertical hole.

Here, the low skew tree structure, corresponding to the existing H-tree structure, means a signal path for preventing generation of the skew. This term is adopted because, in the first embodiment, the signal path does not have the H-tree structure since the light is transmitted radially on the optical waveguide surface.

Figure 3:
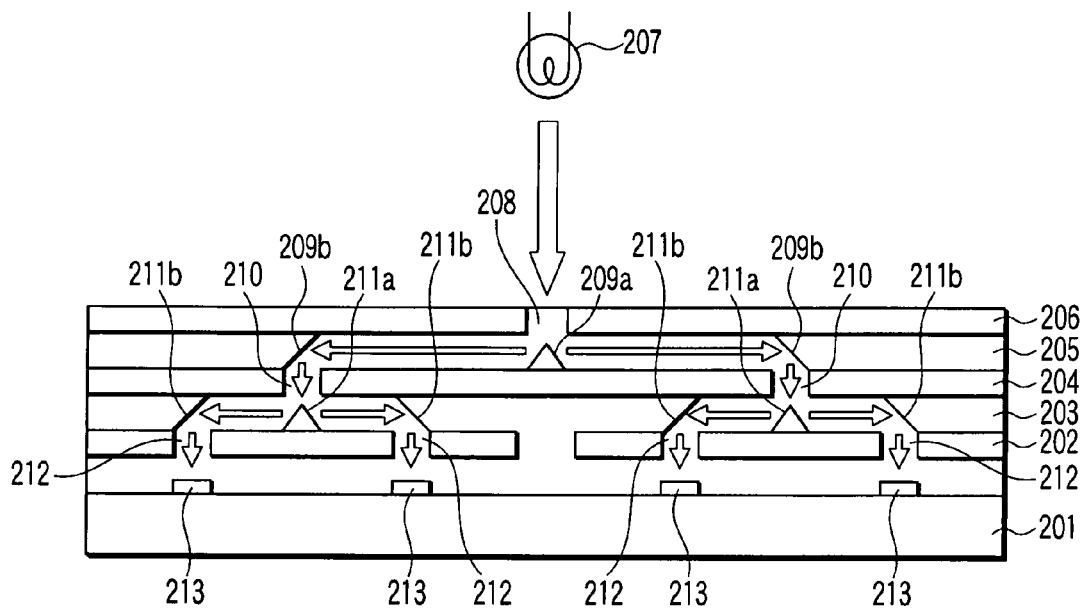
FIG. 3 is a cross sectional view showing a fundamental structure of a first embodiment.
Figure 4:
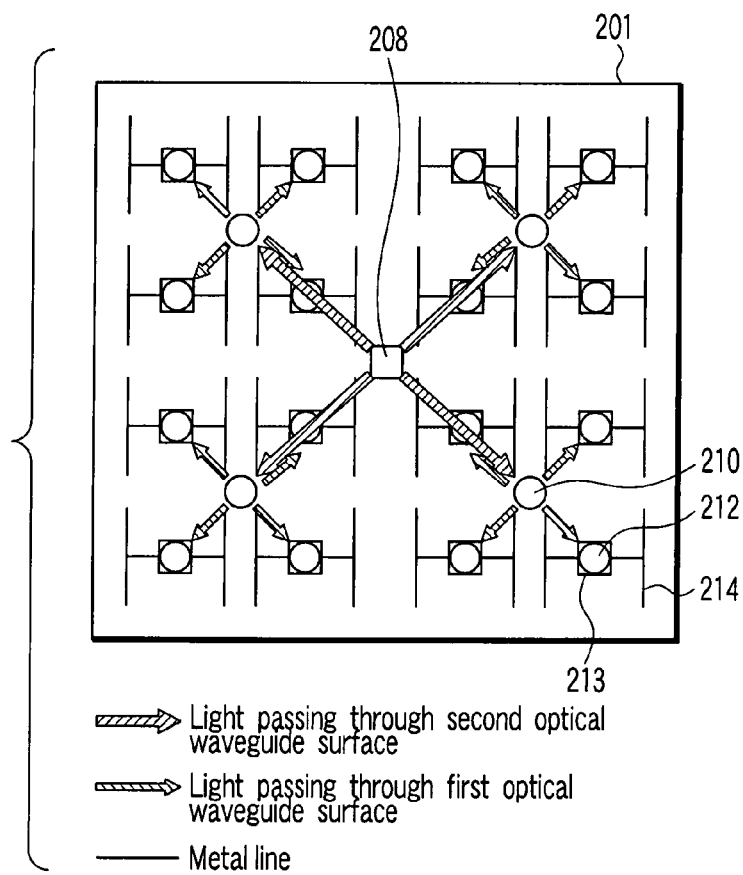
FIG. 4 is a plan view of the semiconductor integrated circuit of FIG. 3.

FIG. 3 shows a semiconductor integrated circuit of the first embodiment. FIG. 4 is a plan view in which the semiconductor integrated circuit of FIG. 3 is viewed from light source side.

A light shielding layer 202 having a function for shielding light is arranged on a metal layer as an uppermost layer of a chip substrate 201.

A first optical waveguide layer 203 by which the optical clock is propagated radially in a surface is arranged on the light shielding layer 202. Reflecting plates 211a and 211b for reflecting the optical clock are arranged in the first optical waveguide layer 203. A light shielding layer 204 having a function for shielding light is further arranged on the first optical waveguide layer 203.

A second optical waveguide layer 205 by which the optical clock is propagated radially in a surface is arranged on the light shielding layer 204. Reflecting plates 209a and 209b for reflecting the optical clock are arranged in the second optical waveguide layer 205. A light shielding layer 206 having a function for shielding light is further arranged on the second optical waveguide layer 205.

The light shielding layers 202, 204 and 206 are constituted from materials having lower refractive index than materials constituting the first and second optical waveguide layers 203 and 205, materials such as metals reflecting the optical clock, or the same materials as those of the reflecting plates 209a, 209b, 211a and 211b.

A light incident hole 208 is bored at approximate center of the light shielding layer 206. A light source 207 is arranged above the light incident hole 208. The light source 207 expresses "H"/"L" of the clock by flickering.

The optical clock made incident into the second optical waveguide layer 205 from the light incident hole 208, whose advancing direction is bent at a right angle by the reflecting plate 209a, advances therefrom radially inside the second optical waveguide layer 205 toward edges of the chip substrate 201.

A plurality of light emission holes 210 are bored in constant distance from the light incident hole 208 on the light shielding layer 204. The reflecting plate 209b is arranged above the light emission hole 210.

The light transmitted inside the second optical waveguide layer 205, whose advancing direction is bent at a right angle by the reflecting plate 209b, moves to the inside of the first optical waveguide layer 203 via the light emission hole 210 from the inside of the second optical waveguide layer 205.

The optical clock made incident into the first optical waveguide layer 203 from the light emission hole 210, whose advancing direction is bent at a right angle by the reflecting plate 211a, advances therefrom radially inside the first optical waveguide layer 203.

A plurality of light emission holes 212 are bored in constant distance from the light emission hole 210 on the light shielding layer 202. The reflecting plate 211b is arranged above the light emission hole 212.

The light transmitted inside the first optical waveguide layer 203, whose advancing direction is bent at a right angle by the reflecting plate 211b, is inputted to a photoelectric conversion element (light→electricity)/local clock driver 213 immediately beneath the light emission hole 212 via the light emission hole 212 from the inside of the first optical waveguide layer 203. The optical clock which is subjected to photoelectric conversion becomes the clock as an electrical signal.

The clock as the electrical signal is transmitted to the logic circuit such as flip-flop, via, for instance, a local clock line 214 constituted from a metal layer.

According to the semiconductor integrated circuit of the first embodiment, the three-dimensional low skew tree structure as a transmission path of the optical clock is realized by the first and second optical waveguide layers (optical waveguide surfaces) 203 and 205, and the light emission holes 210 and 212 for connecting them.

Therefore, since all optical signal paths from the light source 207 to the photoelectric conversion element/local clock driver 213 become equal, the clock skew is not generated even though the optical waveguide surface is used.

Further, if the local clock line 214 extending from the photoelectric conversion element/local clock driver 213 has the H-tree structure, it is possible to substantially reduce the clock skew in the respective portions on the chip.

In the first embodiment, the number of the optical waveguide layer (optical waveguide surface) is two, but according to the three-dimensional low skew tree structure, with the increasing number of the optical waveguide layer, reduction effect of the clock skew in the respective portions on the chip is improved. That is, the number of the optical waveguide layer is not limited to two, but it may be three or more.

Further, as the reflecting plate, a metallic material such as mirror reflecting light is assumed, but any material may be used as long as the advancing direction of the light can be bent at a right angle by the method of refraction, reflection or the like.

In the first embodiment, the clock is transmitted by using the optical waveguide layer (optical waveguide surface); however, the example of the present invention is applicable to the signal (data or the like) in addition to the clock.

C. First Modified Example

Figure 5:
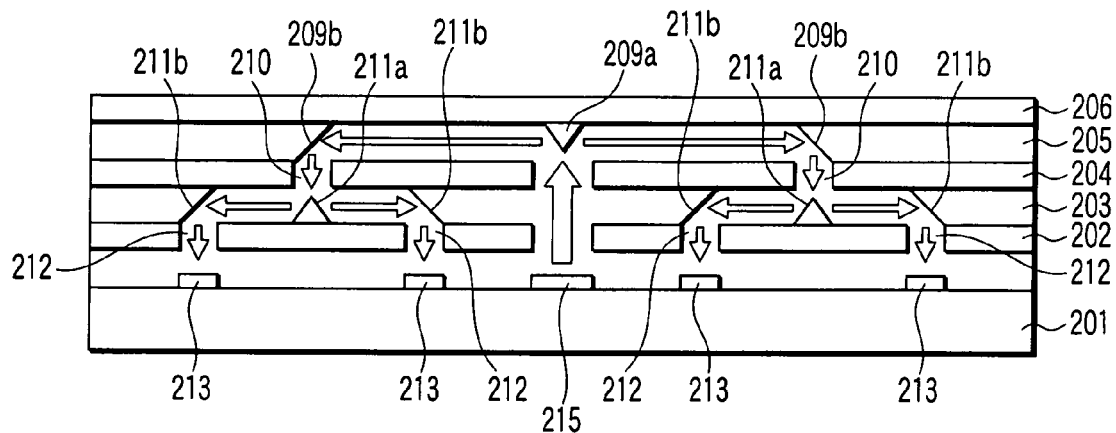
FIG. 5 is a cross sectional view showing a first modified example of the first embodiment.
Figure 6:
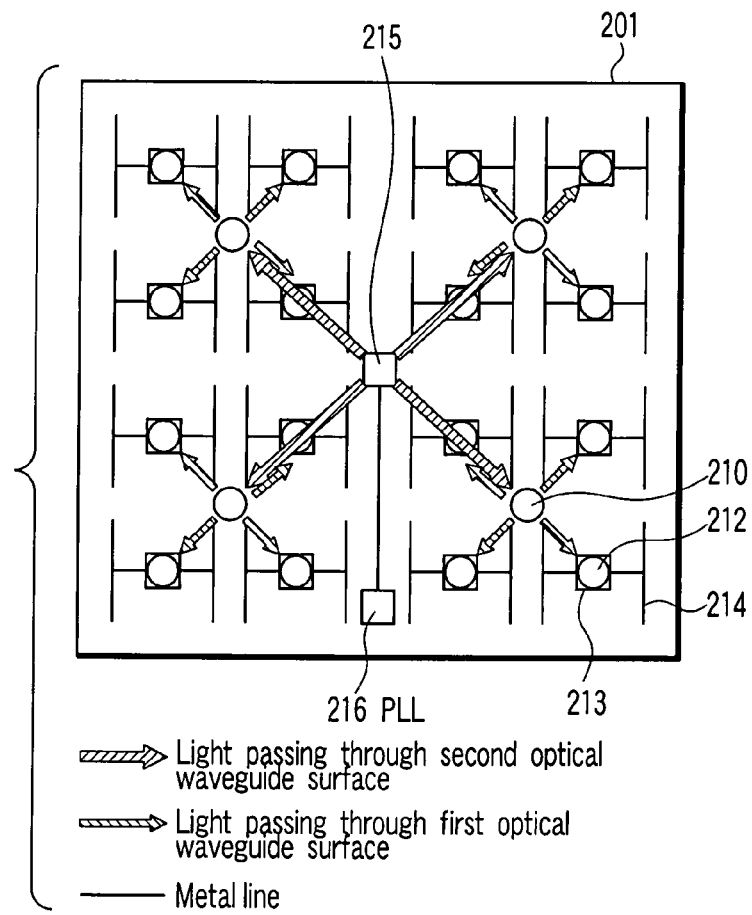
FIG. 6 is a plan view of the semiconductor integrated circuit of FIG. 5.

FIG. 5 shows a semiconductor integrated circuit of the first modified example. FIG. 6 is a plan view of the semiconductor integrated circuit of FIG. 5.

In the first modified example, like the fundamental structure, a three-dimensional low skew tree structure as the transmission path of the optical clock is realized by the first and second optical waveguide layers (optical waveguide surface) 203 and 205, and the light emission holes 210 and 212 connecting them.

A difference between the first modified example and the fundamental structure is a position of the light source. In the first modified example, a photoelectric conversion element (electricity→light) 215 as the light source is arranged on the chip substrate 201. Further, on the chip substrate 201, a PLL circuit 216 (FIG. 6) for generating the clocks is arranged.

The clock as the electrical signal generated by the PLL circuit 216 is subjected to the photoelectric conversion by the photoelectric conversion element 215 into the optical clock. The photoelectric conversion element 215 expresses "H"/"L" of the clock by flickering based on the clock as the electrical signal.

The optical clock emitted toward an upper side of the chip substrate 201 from the photoelectric conversion element 215, whose advancing direction is bent at a right angle by the reflecting plate 209a, advances therefrom radially inside the second optical waveguide layer 205 toward the edges of the chip substrate 201.

A plurality of light emission holes 210 are bored in constant distance from the light incident hole 208 on the light shielding layer 204. The reflecting plate 209b is arranged above the light emission hole 210.

The light transmitted inside the second optical waveguide layer 205, whose advancing direction is bent at a right angle by the reflecting plate 209b, moves to the first optical waveguide layer 203 via the light emission hole 210 from the inside of the second optical waveguide layer 205.

The optical clock made incident into the first optical waveguide layer 203 from the light emission hole 210, whose advancing direction is bent at a right angle by the reflecting plate 211a, advances therefrom radially inside the first optical waveguide layer 203.

A plurality of light emission holes 212 are bored in constant distance from the light emission hole 210 on the light shielding layer 202. The reflecting plate 211b is arranged above the light emission hole 212.

The light transmitted inside the first optical waveguide layer 203, whose advancing direction is bent at a right angle by the reflecting plate 211b, is inputted to a photoelectric conversion element (light→electricity)/local clock driver 213 immediately beneath the light emission hole 212 via the light emission hole 212 from the inside of the first optical waveguide layer 203. The optical clock which is subjected to photoelectric conversion becomes the clock as an electrical signal.

The clock as the electrical signal is transmitted to the logic circuit such as flip-flop, via, for instance, a local clock line 214 constituted from a metal layer.

Also in the semiconductor integrated circuit of the first modified example, it is possible to obtain the effect of the first embodiment described in the fundamental structure.

D. Second Modified Example

Figure 7:
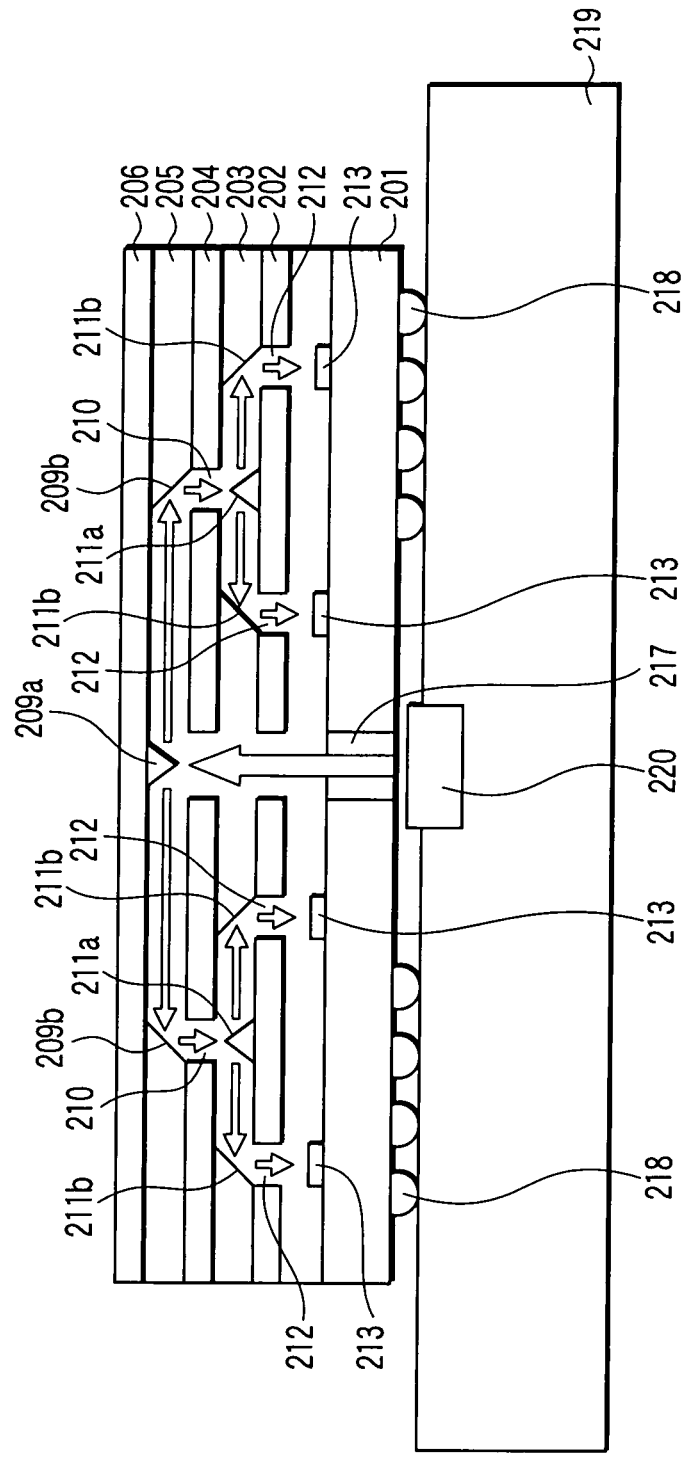
FIG. 7 is a cross sectional view showing a second modified example of the first embodiment.
Figure 8:
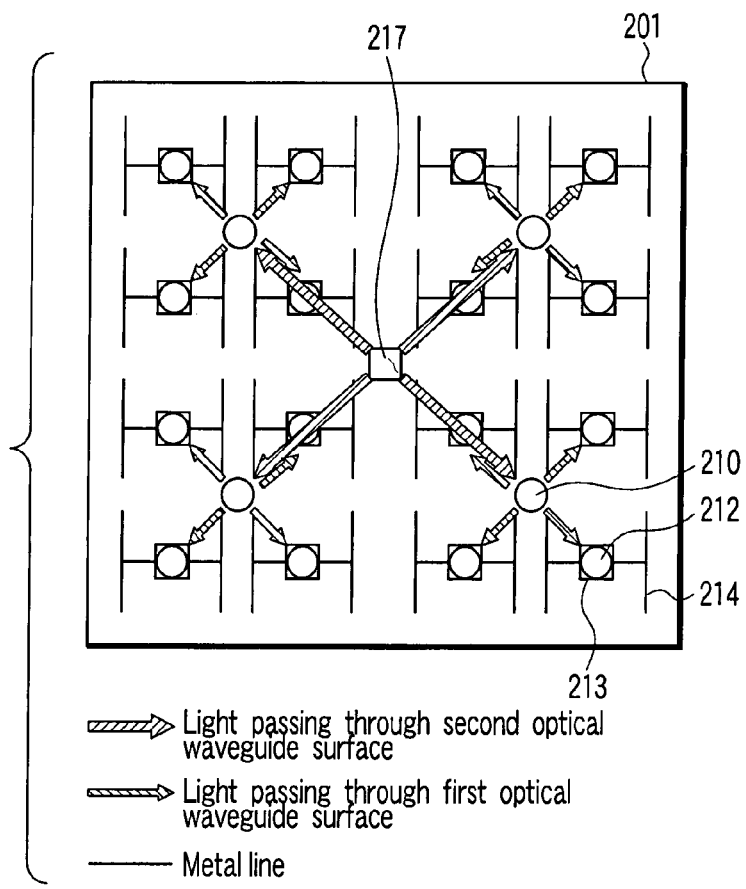
FIG. 8 is a plan view of the semiconductor integrated circuit of FIG. 7.

FIG. 7 shows a semiconductor integrated circuit of the second modified example. FIG. 8 is a plan view of the semiconductor integrated circuit of FIG. 7.

Also in the second modified example, like the fundamental structure, a three-dimensional low skew tree structure as the transmission path of the optical clock is realized by the first and second optical waveguide layers (optical waveguide surface) 203 and 205, and the light emission holes 210 and 212 connecting them.

A difference between the second modified example and the fundamental structure is a position of the light source. In the second modified example, a light source 220 is arranged on a printed circuit board 219 on which the chip substrate 201 is mounted.

The light source 220 may be the light source such as that of the fundamental structure, or may be the photoelectric conversion element (electricity→light) such as that of the first modified example.

In the case where the light source is the photoelectric conversion element as in the first modified example, the PLL circuit generating clocks as the electrical signals is mounted on the printed circuit board 219 in addition to the photoelectric conversion element.

In this case, it is preferable that the photoelectric conversion element and the PLL circuit are formed in one chip, which is then mounted on the printed circuit board 219.

The light source expresses "H"/"L" of the clock by flickering.

A plurality of bumps (solder ball) 218 for mounting the chip substrate 201 on the printed circuit board 219 are arranged on a rear surface of the chip substrate 201. Further, a light incident hole 217 is bored at approximate center of the chip substrate 201.

The optical clock emitted toward the upper side of the chip substrate 201 via the light incident hole 217 from the light source 220, whose advancing direction is bent at a right angle by the reflecting plate 209a, advances therefrom radially inside the second optical waveguide layer 205 toward the edges of the chip substrate 201.

A plurality of light emission holes 210 are bored in constant distance from the light incident hole 208 on the light shielding layer 204. The reflecting plate 209b is arranged above the light emission hole 210.

The light transmitted inside the second optical waveguide layer 205, whose advancing direction is bent at a right angle by the reflecting plate 209b, moves to the inside of the first optical waveguide layer 203 via the light emission hole 210 from the inside of the second optical waveguide layer 205.

The optical clock made incident into the first optical waveguide layer 203 from the light emission hole 210, whose advancing direction is bent at a right angle by the reflecting plate 211a, advances therefrom radially inside the first optical waveguide layer 203.

A plurality of light emission holes 212 are bored in constant distance from the light emission hole 210 on the light shielding layer 202. The reflecting plate 211b is arranged above the light emission hole 212.

The light transmitted inside the first optical waveguide layer 203, whose advancing direction is bent at a right angle by the reflecting plate 211b, is inputted to the photoelectric conversion element (light→electricity)/local clock driver 213 immediately beneath the light emission hole 212 via the light emission hole 212 from the inside of the first optical waveguide layer 203. The optical clock which is subjected to photoelectric conversion becomes the clock as an electrical signal.

The clock as the electrical signal is transmitted to the logic circuit such as flip-flop, via, for instance, a local clock line 214 constituted from a metal layer.

In the semiconductor integrated circuit of the second modified example, it is possible to obtain the effect of the first embodiment described in the fundamental structure.

E. Summary

According to the first embodiment, it is possible to substantially reduce the timing skew of the signals at the respective portions on the chip by the three-dimensional low skew tree structure using the plurality of optical waveguide surfaces. Therefore, if the products are manufactured in the same process, compared with existing products, it is possible to operate the semiconductor integrated circuit with higher frequency.

(2) Second Embodiment

A. Reference Example

Figure 9:
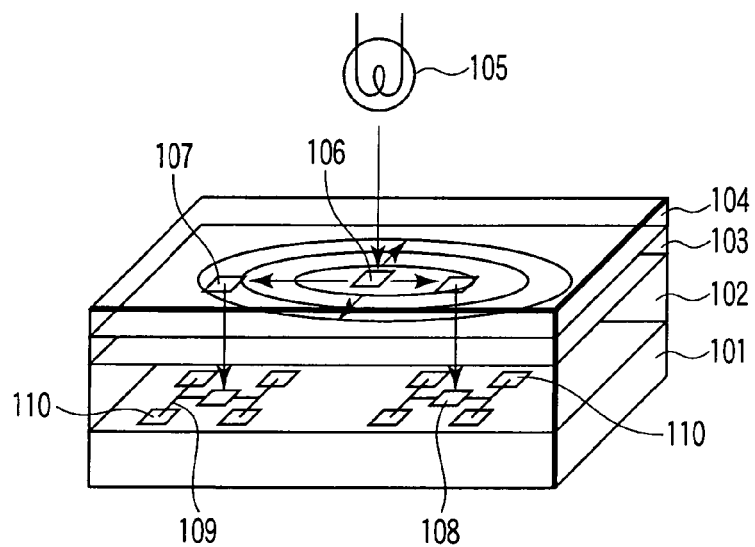
FIG. 9 is a cubic diagram showing the semiconductor integrated circuit as a reference example.
Figure 10:
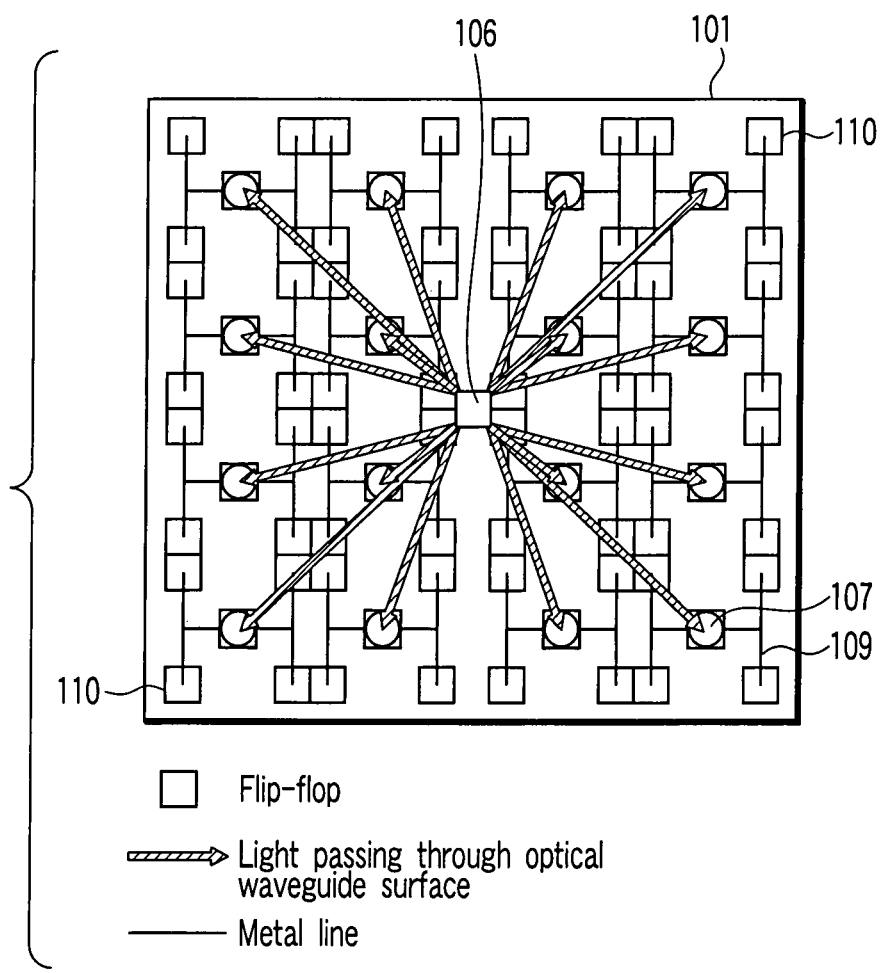
FIG. 10 is a plan view of the semiconductor integrated circuit of FIG. 9.

FIG. 9 shows an optical clock semiconductor integrated circuit. FIG. 10 is a plan view in which the semiconductor integrated circuit of FIG. 9 is viewed from the light source side.

The semiconductor integrated circuit is different from the reference examples of FIGS. 1 and 2 in that a flip-flop 110 is connected to a leading end of the local clock line 109 of the H-tree structure.

The optical clock transmitted inside the optical waveguide layer (optical waveguide surface) 103 is inputted to the photoelectric conversion element/local clock driver 108 via the light emission hole 107.

The photoelectric conversion element/local clock driver 108 supplies the electrical clock to the flip-flop 110 via the local clock line 109 after the optical clock is converted into the electrical clock, and waveform shaping and driving force increase are performed.

Figure 11:
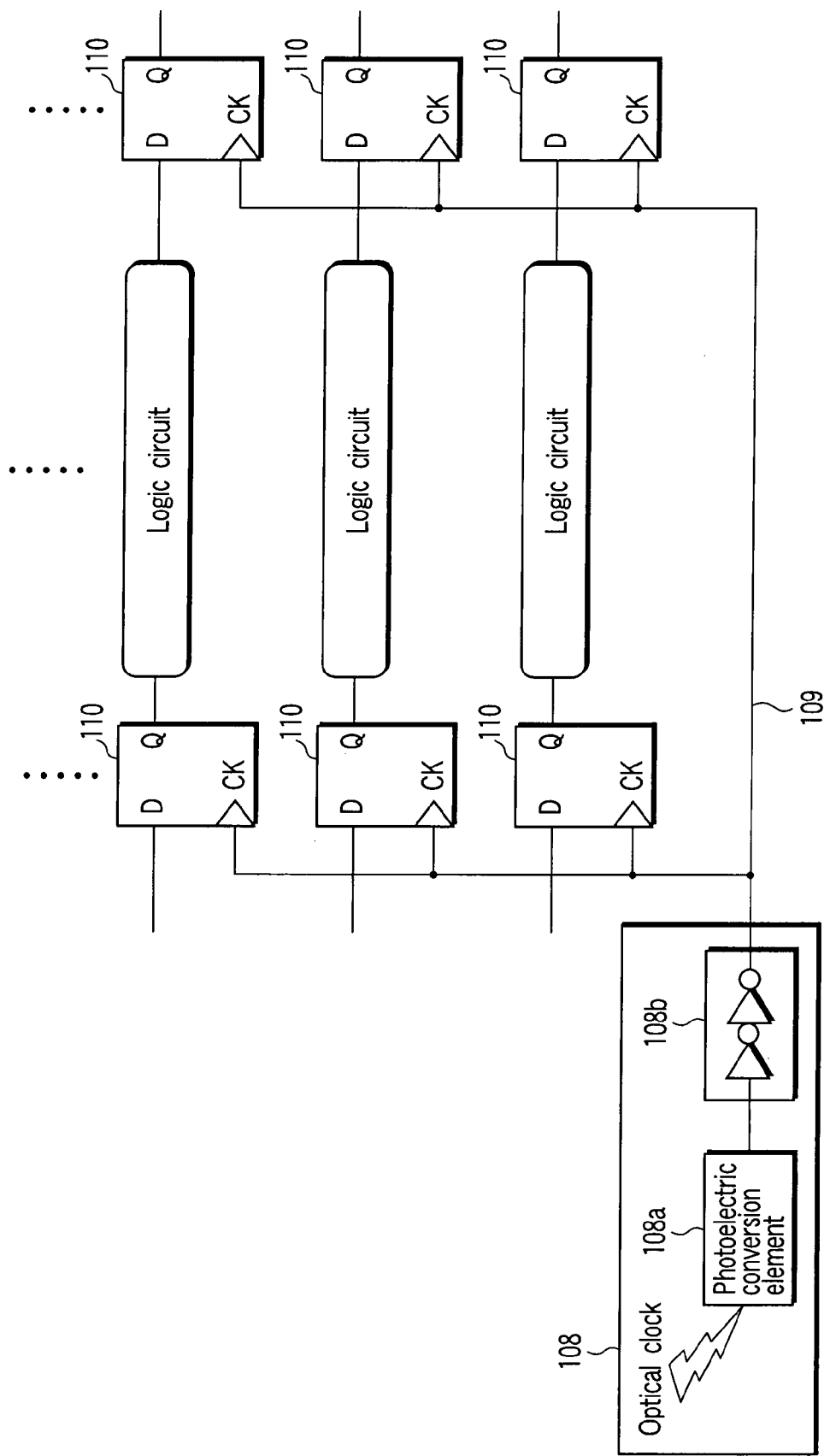
FIG. 11 is a circuit diagram showing connection relationship from a photoelectric conversion element to a flip-flop.

FIG. 11 shows a circuit diagram of the optical clock semiconductor integrated circuit of FIG. 9.

This indicates that the semiconductor integrated circuit is the same as a semiconductor integrated circuit which uses only the electrical clock with the exception of the photoelectric conversion element 108a and the local clock driver 108b.

That is, concerning the H-tree structure by the local clock line 109 and the flip-flop 110, there is no difference between the optical clock semiconductor integrated circuit and the semiconductor integrated circuit using only the electrical clock.

Figure 12:
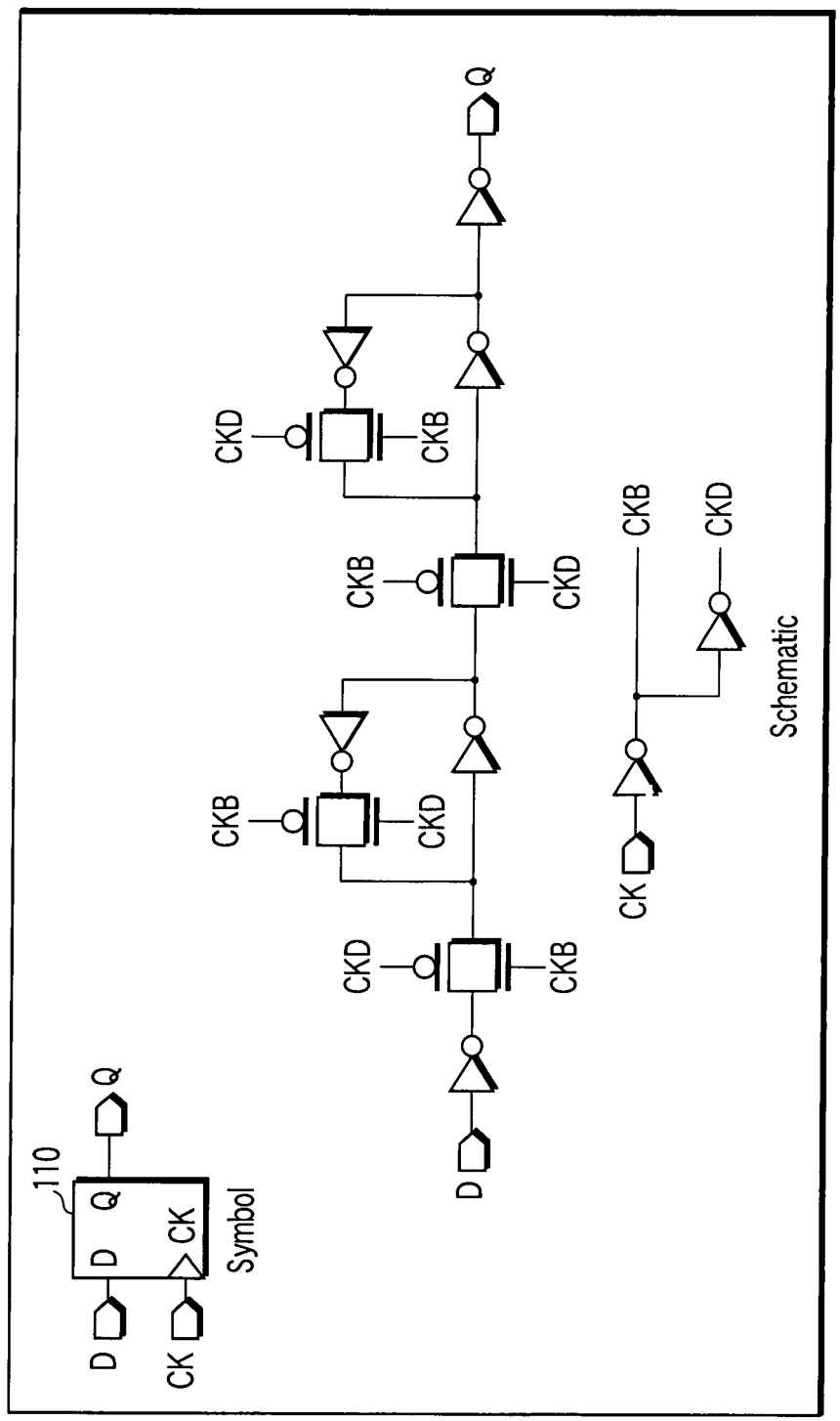
FIG. 12 a circuit diagram showing the flip-flop.

FIG. 12 shows the circuit diagram of the flip-flop of FIG. 11.

The flip-flop 110 is comprised a CMOS inverter and a CMOS transfer gate. Clock CK is inputted to a clock terminal of the flip-flop 110. Then, two clocks CKB and CKD are further generated from the clock CK.

The clock CKB is a clock having inverted phase to the clock CK, and the clock CKD is a clock in which the phase of the clock CK is duplicated.

When the clock CK is "L", the data is captured in the flip-flop 110 from the D input terminal, a value of the D input terminal at the moment when the clock CK changes to "H" from "L" is kept in the flip-flop 110, and the value is outputted from a Q output terminal.

After that, the value of the Q output terminal is kept until the clock CK changes to "H" from "L" again.

This semiconductor integrated circuit must transmit the electrical clock to the flip-flop 110 by the local clock line 109, after converting the optical clock into the electrical clock.

For this reason, even though the phases of the optical clock are aligned in front of the photoelectric conversion element 108a, in some cases, the phases of the electrical clock inputted to the flip-flop 110 are out of alignment resulting from variation of characteristics of the photoelectric conversion element.

Further, even though the optical clock is used, ultimately, the electrical clock should be supplied to the flip-flop 110 after converting the optical clock into the electrical clock. Accordingly, the chip layout becomes complicated, and the chip area and the power consumption increase by the photoelectric conversion element 108a, the local clock driver 108b and the local clock line 109.

B. Fundamental Structure

The second embodiment proposes a technique for realizing logic circuits such as flip-flop by using a switch element capable of controlling directly ON/OFF of an electrical signal path by an optical signal.

Figure 13:
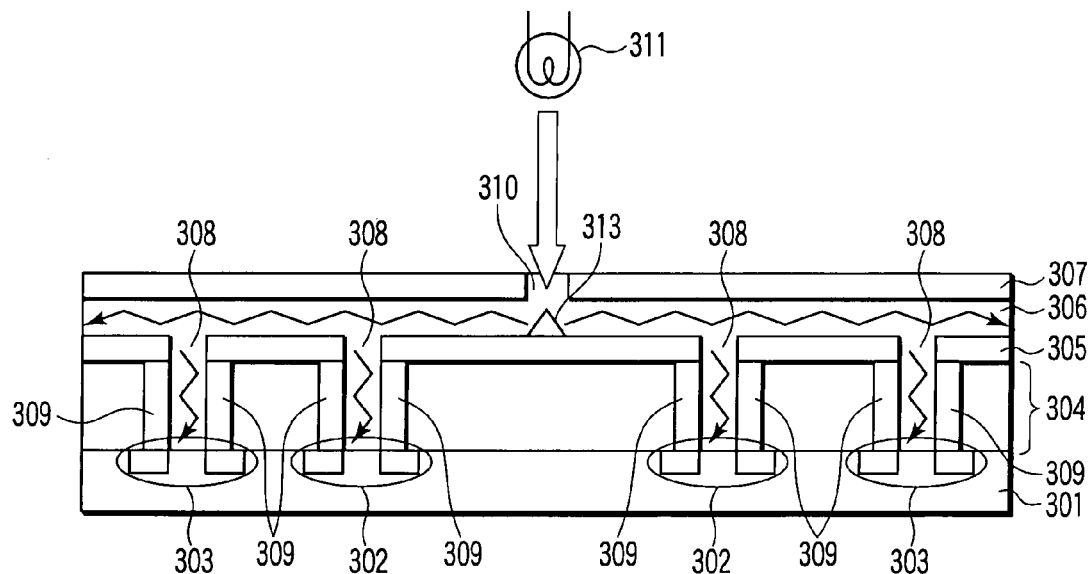
FIG. 13 is a cross sectional view showing a fundamental structure of a second embodiment.
Figure 14:
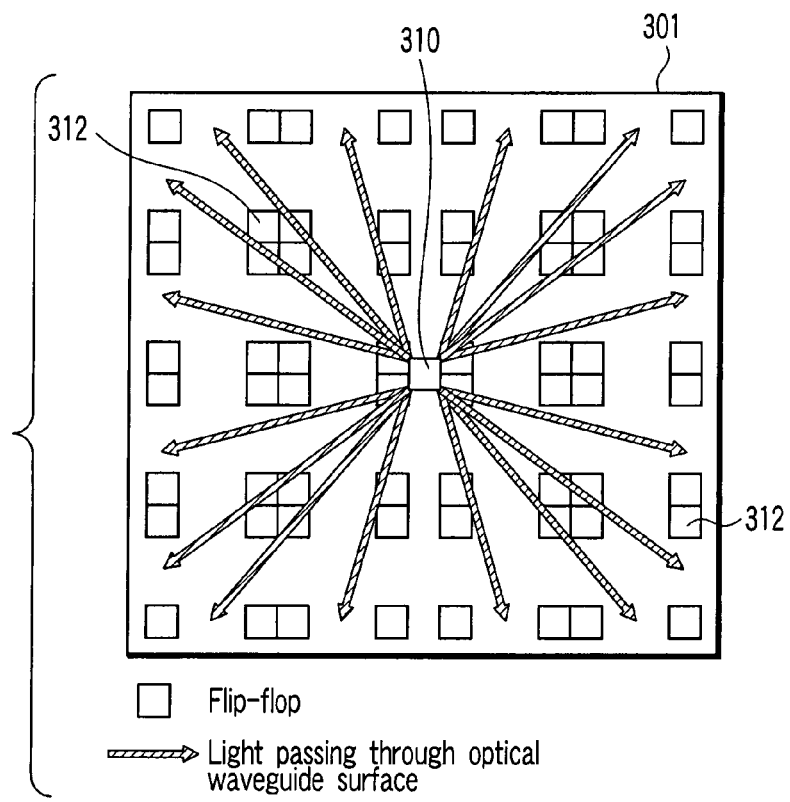
FIG. 14 is a plan view of the semiconductor integrated circuit of FIG. 13.

FIG. 13 shows a semiconductor integrated circuit of the second embodiment. FIG. 14 is a plan view in which the semiconductor integrated circuit of FIG. 13 is viewed from the light source side.

Switch elements 302 and 303 capable of directly controlling ON/OFF of the electrical signal path by an optical signal are arranged in a surface region on a chip substrate 301.

For instance, in the case where two kinds of strong and weak light intensities are prepared, the switch element 302 is an element which is turned ON when the light intensity is strong, and is turned OFF when the light intensity is weak, while the switch element 303 is an element which is turned ON when the light intensity is weak, and is turned OFF when the light intensity is strong.

For instance, a flip-flop 312 is constituted by the switch elements 302 and 303.

Structure of the switch elements 302 and 303 is not particularly restricted, and thus any structure may be permitted as long as the switch element can control ON/OFF of the electrical signal path by the optical signal.

A metal wiring region 304 is arranged on the chip substrate 301. The metal wiring region 304 is comprised a plurality of stacked metal layers. A light shielding layer 305 having a function for shielding light is arranged on the metal wiring region 304.

An optical waveguide layer (optical waveguide surface) 306 by which the optical clock is propagated radially in a surface is arranged on the light shielding layer 305. A reflecting plate 313 for reflecting the optical clock is arranged in the optical waveguide layer 306. The reflecting plate 313 may be made of any material, such as metallic material reflecting the light as a mirror, as long as the advancing direction of the light can be bent at a right angle by the method of refraction, reflection or the like.

A light shielding layer 307 having a function for shielding light is further arranged on the optical waveguide layer 306.

A light emission hole 308 is arranged between the switch elements 302 and 303, and the optical waveguide layer 306. The light emission hole 308 is filled with the same material as the optical waveguide layer 306, and its periphery is surrounded by the light shielding layer 309.

The light shielding layers 305, 307 and 309 are constituted from materials having lower refractive index than the material constituting the optical waveguide layer 306, materials such as metal reflecting the optical clock, or the same material as that of the reflecting plate 313.

A light incident hole 310 is bored at approximate center of the light shielding layer 307. A light source 311 is arranged above the light incident hole 310. The light source 311 expresses "H"/"L" of the clock by flickering.

The optical clock made incident into the optical waveguide layer 306 from the light incident hole 310, whose advancing direction is bent at a right angle by the reflecting plate 313, advances therefrom radially inside the optical waveguide layer 306 toward the edges of the chip substrate 301.

The optical clock is supplied to the switch elements 302 and 303 via the light emission hole 308 provided on the light shielding layer 305.

Since the switch elements 302 and 303 are turned ON/OFF directly based on the light intensity (strong/weak) of the optical clock, operation of the flip-flop 312 is controlled directly by the optical clock.

Figure 15:
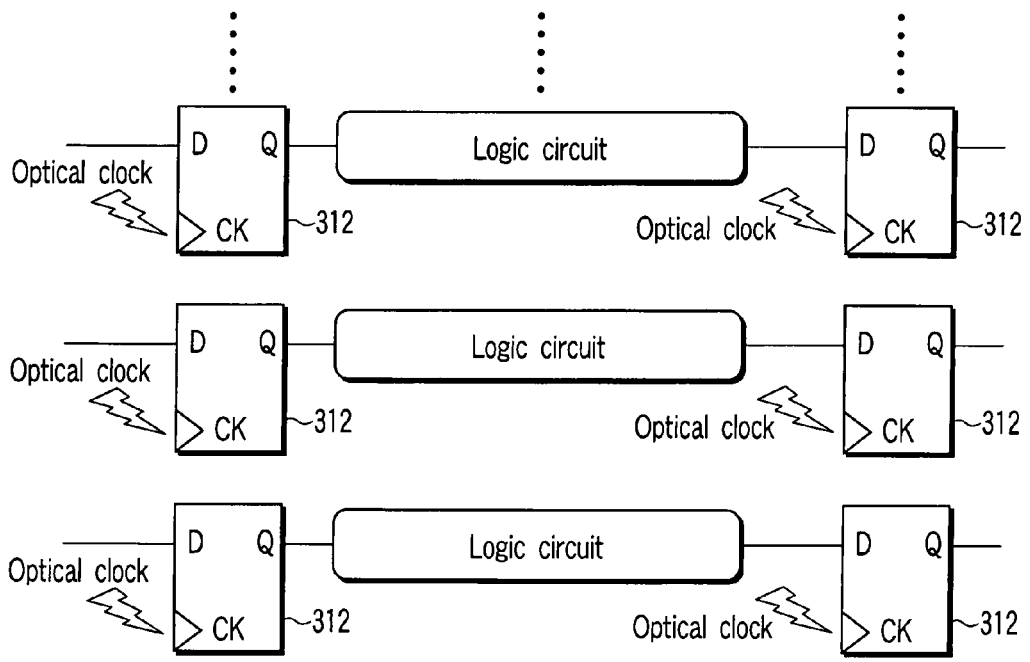
FIG. 15 is a circuit diagram showing a state where an optical clock is supplied directly to the flip-flop.

According to the semiconductor integrated circuit of the second embodiment, for instance, as shown in FIG. 15, it is possible to control operation of the flip-flop 312 by supplying the optical clock directly to the flip-flop 312. That is, since it is not necessary to convert the optical clock into the electrical clock, it is not necessary to provide the photoelectric conversion element, the local clock driver, the local clock line of the H-tree structure or the like.

Therefore, it is possible to substantially reduce the clock skew at the respective portions on the chip by sufficiently bringing out feature of ultrahigh speed of the optical clock.

Further, since it is not necessary to provide the photoelectric conversion element, the local clock driver, the local clock line or the like, it is possible to realize simplification of the chip layout, and further reduction of the chip area and decrease in the power consumption.

Figure 16:
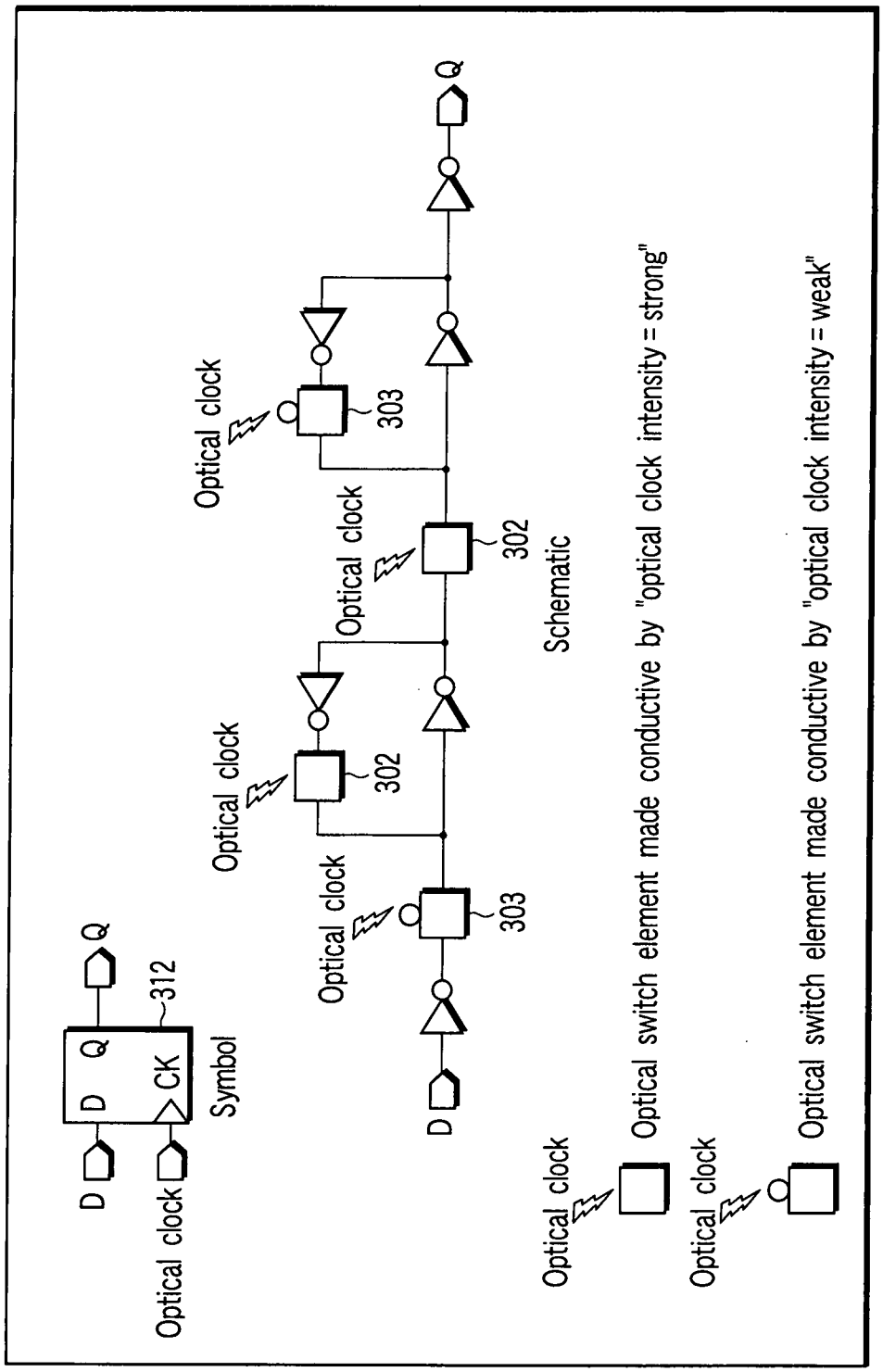
FIG. 16 is a circuit diagram showing an optical gating flip-flop.

FIG. 16 shows a circuit diagram of the flip-flop.

The flip-flop 312 is comprised a CMOS inverter and an optical switch element. Such flip-flop is referred to as an optical gated flip-flop.

The optical clock CK is directly inputted to a clock terminal of the flip-flop 312.

When the light intensity (optical clock intensity) of the optical clock CK is "weak", the data is captured in the flip-flop 312 from the D input terminal, a value of the D input terminal at the moment when the light intensity of the optical clock CK changes to "strong" from "weak" is kept in the flip-flop 312, and the value is outputted from the Q output terminal.

After that, the value of the Q output terminal is kept until the optical clock CK changes to "strong" from "weak" again.

Thus, when using the switch elements 302 and 303 directly controlled by the optical clock, as clarified by comparing FIG. 12 with FIG. 16, auxiliary effect of remarkably reducing the number of elements is obtained.

According to the flip-flop of FIG. 16, it is not necessary to provide two kinds of clocks and the transfer gate.

Meanwhile, in the second embodiment, the number of the optical waveguide layer (optical waveguide surface) is one, but like the first embodiment, it is possible to utilize a plurality of optical waveguide layers.

That is, in the second embodiment, if completing the three-dimensional low skew tree structure while stacking a plurality of optical waveguide layers, effect of reducing the clock skew at the respective portions on the chip is further improved.

The second embodiment transmits the clock by using the optical waveguide layer (optical waveguide surface); however, the example of the present invention is applicable to signal (data or the like) in addition to the clock.

C. First Modified Example

Figure 17:
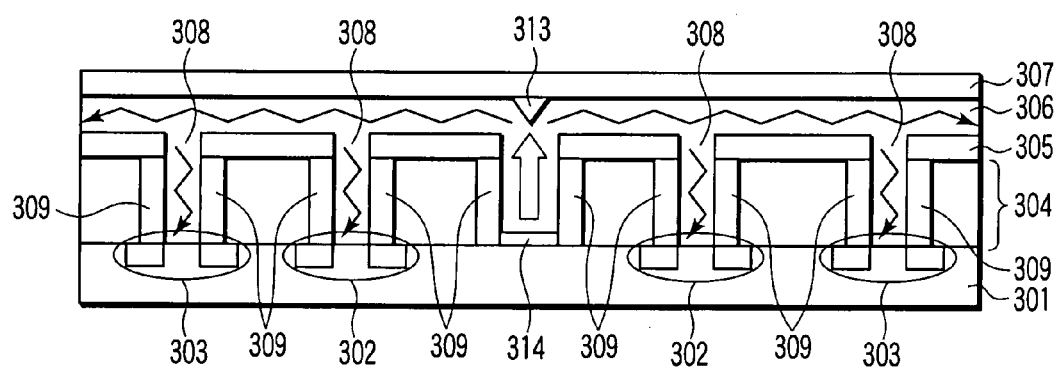
FIG. 17 is a cross sectional view showing a first modified example of the second embodiment.
Figure 18:
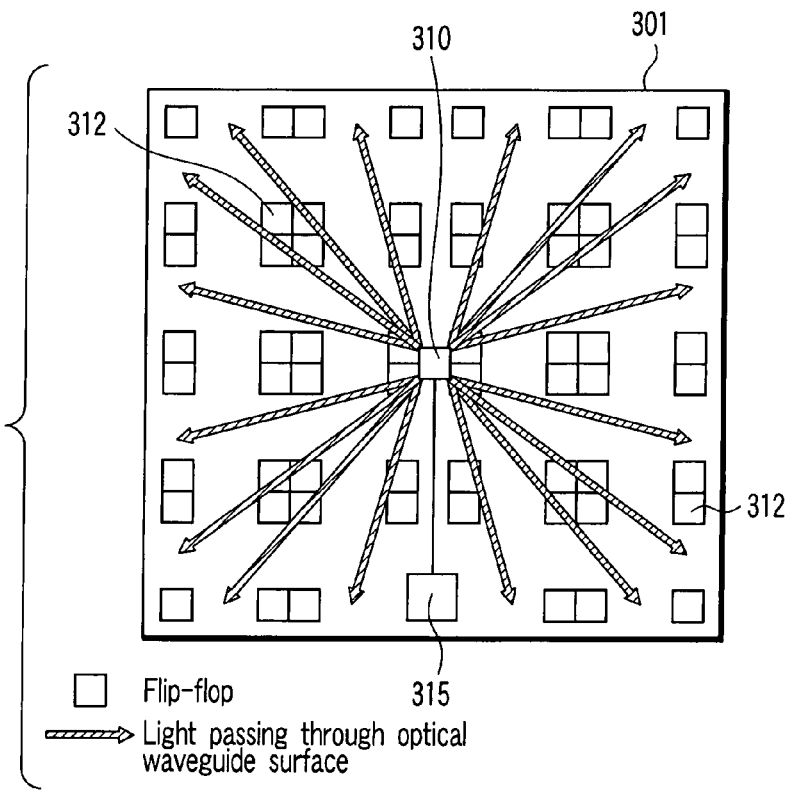
FIG. 18 is a plan view of the semiconductor integrated circuit of FIG. 17.

FIG. 17 shows a semiconductor integrated circuit of the first modified example. FIG. 18 is a plan view of the semiconductor integrated circuit of FIG. 17.

A difference between the first modified example and the fundamental structure is a position of the light source. In the first modified example, a photoelectric conversion element (electricity→light) 314 as the light source is arranged on the chip substrate 301. Further, on the chip substrate 301, a PLL circuit 315 (FIG. 18) for generating the clocks is arranged.

The electrical clock generated by the PLL circuit 315 is converted into the optical clock by the photoelectric conversion element 314. The optical clock, whose advancing direction is bent at a right angle by the reflecting plate 313, advances therefrom radially inside the optical waveguide layer 306 toward the edges of the chip substrate 301.

The optical clock is supplied to the switch elements 302 and 303 immediately beneath the light emission hole 308 via the light emission hole 308. The switch elements 302 and 303 constitute the logic circuit such as flip-flop, and ON/OFF of the switch elements 302 and 303 is controlled directly by the optical clock.

In the semiconductor integrated circuit of the first modified example, it is possible to obtain the effect of the second embodiment described in the fundamental structure.

D. Second Modified Example

Figure 20:
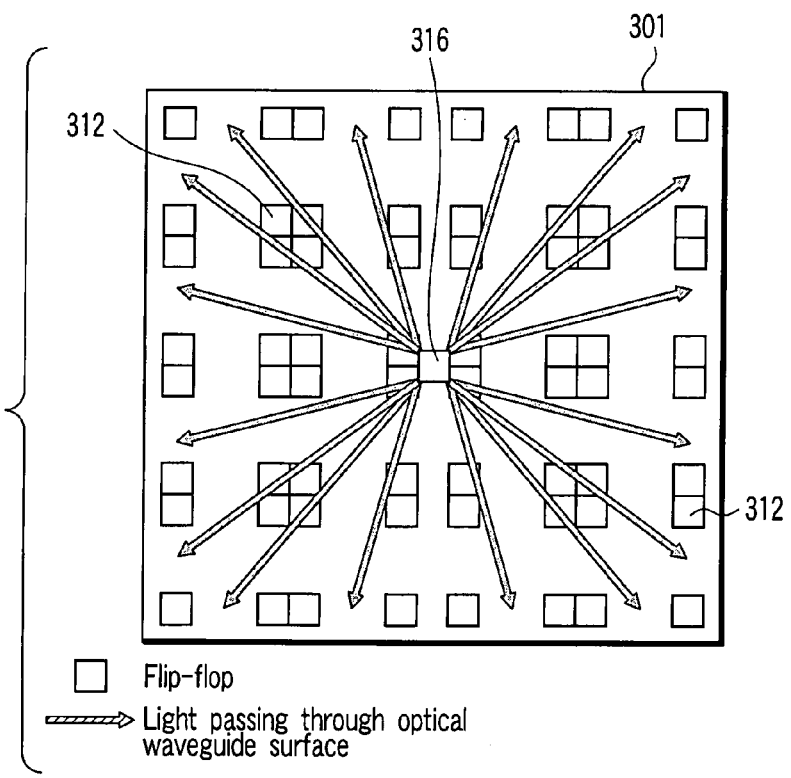
FIG. 20 is a plan view of the semiconductor integrated circuit of FIG. 19.
Figure 19:
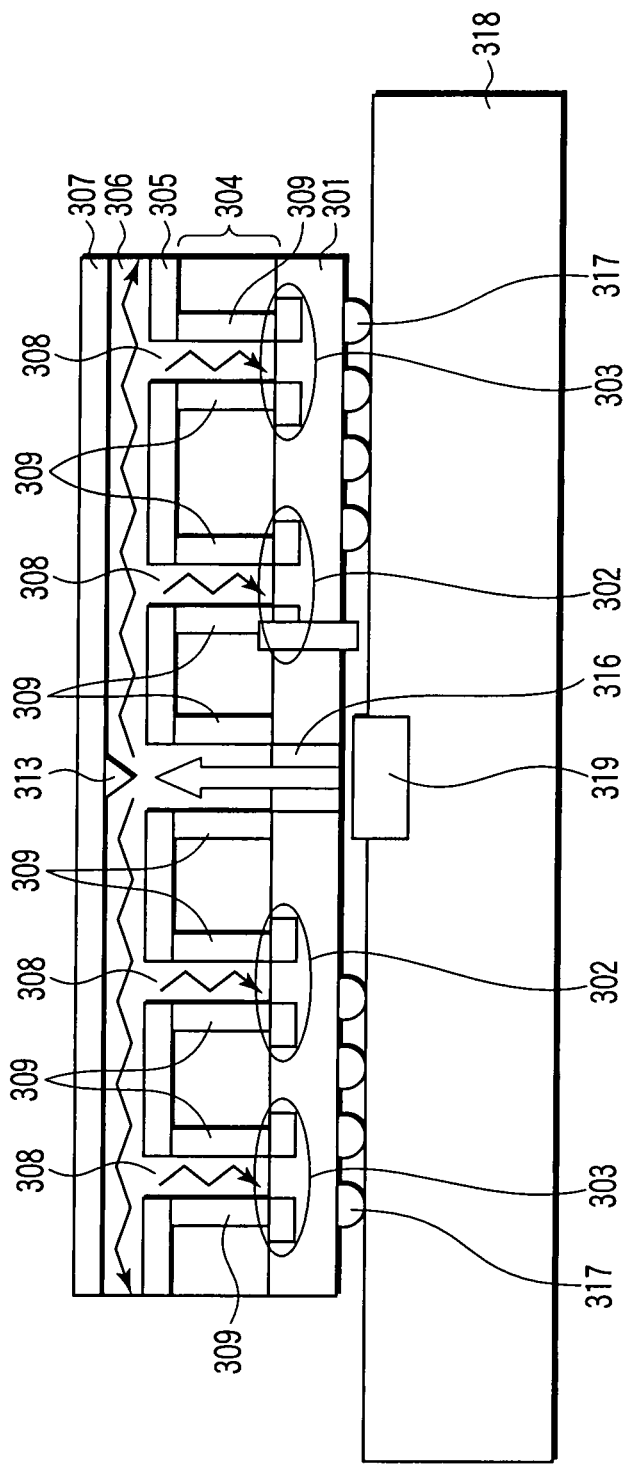
FIG. 19 is a cross sectional view showing a second modified example of the second embodiment.

FIG. 19 shows a semiconductor integrated circuit of the second modified example. FIG. 20 is a plan view of the semiconductor integrated circuit of FIG. 19.

A difference between the second modified example and the fundamental structure is also a position of the light source. In the second modified example, a light source 319 is arranged on a printed circuit board 318 on which the chip substrate 301 is mounted.

The light source 319 may be the light source such as that of the fundamental structure, or may be the photoelectric conversion element (electricity→light) such as that of the first modified example.

In the case where the light source 319 is the photoelectric conversion element as in the first modified example, the PLL circuit generating electrical clocks is mounted on the printed circuit board 318 in addition to the photoelectric conversion element.

In this case, it is preferable that the photoelectric conversion element and the PLL circuit are formed in one chip, which is then mounted on the printed circuit board 318.

A plurality of bumps (solder ball) 317 for mounting the chip substrate 301 on the printed circuit board 318 are arranged on a rear surface of the chip substrate 301. Further, the light incident hole 316 is bored at approximate center of the chip substrate 301.

The optical clock generated by the light source 319, whose advancing direction is bent at a right angle by the reflecting plate 313, advances therefrom radially inside the optical waveguide layer 306 toward the edges of the chip substrate 301.

The optical clock is supplied to the switch elements 302 and 303 immediately beneath the light emission hole 308 via the light emission hole 308. The switch elements 302 and 303 constitute the logic circuit such as flip-flop, and ON/OFF of the switch elements 302 and 303 is controlled directly by the optical clock.

In the semiconductor integrated circuit of the second modified example, it is also possible to obtain the effect of the second embodiment described in the fundamental structure.

E. Third Modified Example

Figure 21:
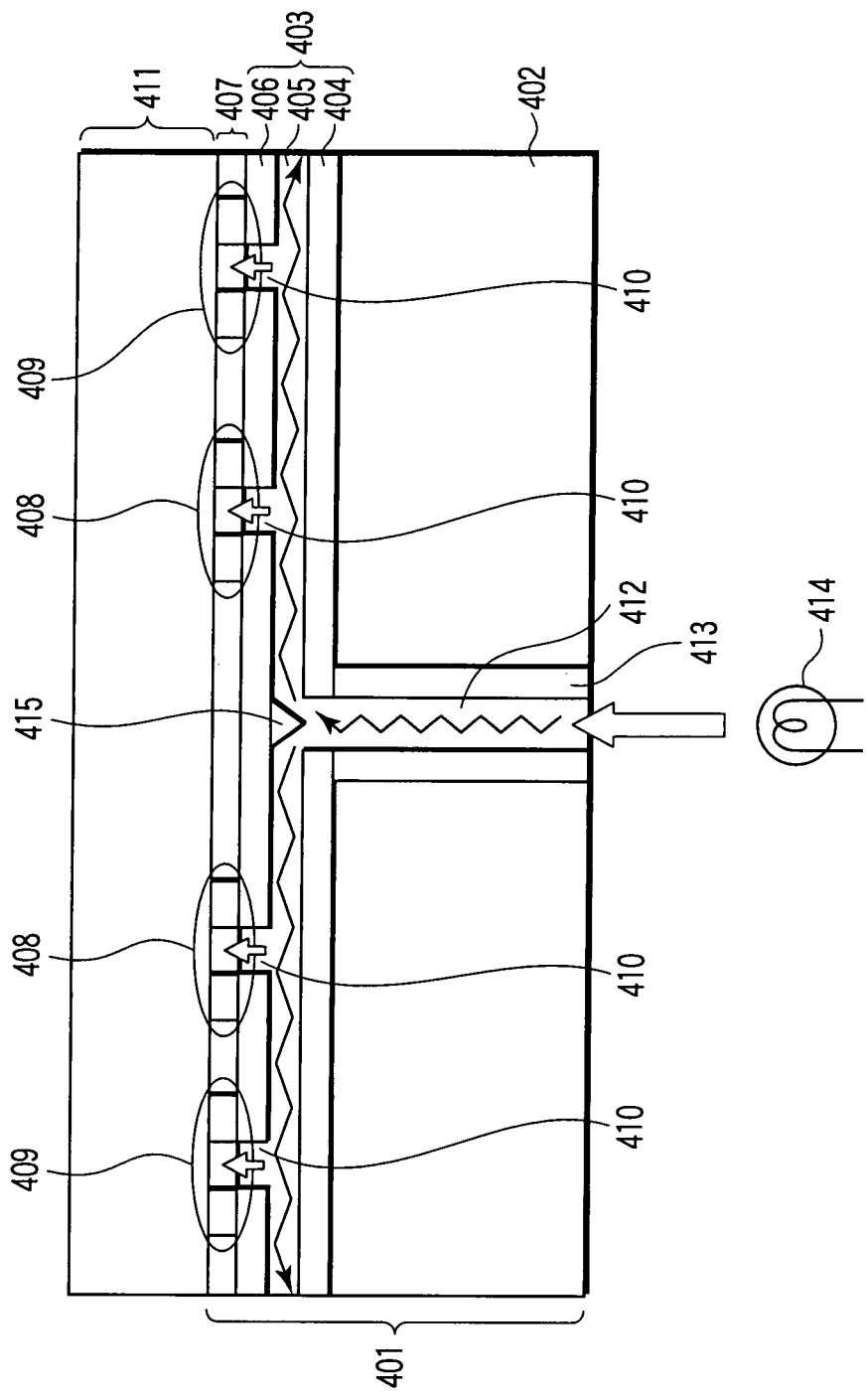
FIG. 21 is a cross sectional view showing a third modified example of the second embodiment.

FIG. 21 shows a semiconductor integrated circuit of the third modified example.

A characteristic of the third modified example lies in a point that an SOI (silicon on insulator) chip substrate 401 is used. That is, an optical waveguide layer (optical waveguide surface) 405 is formed by utilizing an insulating layer 403 of the SOI chip substrate 401.

The SOI chip substrate 401 is comprised a semiconductor substrate 402, a silicon layer 407 and the insulating layer 403 between the semiconductor substrate 402 and the silicon layer 407.

The insulating layer 402 is comprised light shielding layers 404 and 406, and an optical waveguide layer 405 between the light shielding layers 404 and 406. The light shielding layers 404 and 406 have a function for shielding light, and the optical waveguide layer 405 has a function for radially propagating the optical clock in a surface.

A reflecting plate 415 for reflecting the optical clock is arranged inside the optical waveguide layer 405. The reflecting plate 415 may be made of any material, such as metallic material reflecting the light as a mirror, as long as the advancing direction of the light can be bent at a right angle by the method of refraction, reflection or the like.

The switch elements 408 and 409 capable of controlling directly ON/OFF of the electrical signal path by the optical signal are arranged in the silicon layer 407.

For instance, in the case where two kinds of strong and weak light intensities are prepared, the switch element 408 is an element which is turned ON when the light intensity is strong, and is turned OFF when the light intensity is weak, while the switch element 409 is an element which is turned ON when the light intensity is weak, and is turned OFF when the light intensity is strong.

For instance, the logic circuit such as flip-flop is constituted by the switch elements 408 and 409.

Structure of the switch elements 408 and 409 is not particularly restricted, and thus any structure may be permitted as long as the switch element can control ON/OFF of the electrical signal path by the optical signal.

A metal wiring region 411 is arranged on the silicon layer 407. The metal wiring region 411 is comprised a plurality of stacked metal layers.

The light emission hole 410 is arranged between the optical waveguide layer 405 and the switch elements 408 and 409. The light emission hole 410 is filled with the same material as that of the optical waveguide layer 405.

Further, the light incident hole 412 reaching the optical waveguide layer 405 is bored in the semiconductor substrate 402. The light incident hole 412 is filled with the same material as that of the optical waveguide layer 405, and its periphery is surrounded by the light shielding layer 413.

The light shielding layers 404, 406 and 413 are constituted from materials having lower refractive index than materials constituting the optical waveguide layer 405, materials such as metals reflecting the optical clock, or the same material as that of the reflecting plate 415.

A light source 414 is arranged below the light incident hole 412. The light source 414 expresses "H"/"L" of the clock by flickering.

The optical clock made incident from the light incident hole 412, whose advancing direction is bent at a right angle by the reflecting plate 415, advances therefrom radially inside the optical waveguide layer 405 toward the edges of the SOI chip substrate 401.

The optical clock is supplied to the switch elements 408 and 409 via the light emission hole 410 provided on the light shielding layer 406.

Since the switch elements 408 and 409 are turned ON/OFF directly based on the light intensity (strong/weak) of the optical clock, operation of the logic circuit such as flip-flop is controlled directly by the optical clock.

Also in the semiconductor integrated circuit of the third modified example, it is possible to obtain the effect of the second embodiment described in the fundamental structure.

F. Fourth Modified Example

Figure 22:
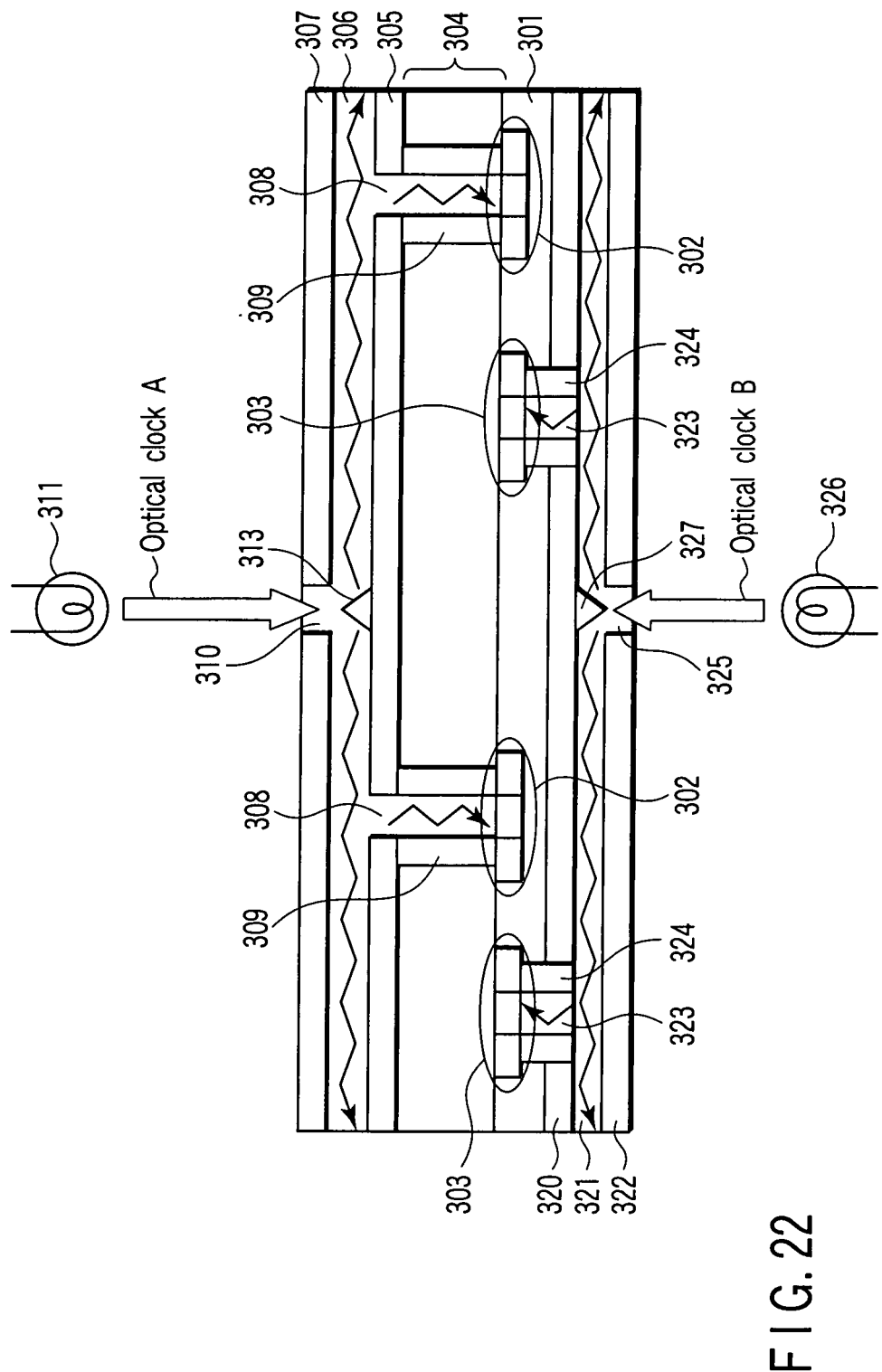
FIG. 22 is a cross sectional view showing a fourth modified example of the second embodiment.

FIG. 22 shows a semiconductor integrated circuit of the fourth modified example.

A characteristic of the fourth modified example lies in a point that two light sources are prepared, two kinds of optical clocks are generated whose phases are mutually different by 180° by using the two light sources, and further, two optical waveguide layers (optical waveguide surface) for transmitting separately two kinds of optical clocks are respectively provided on both surfaces of the chip substrate.

Switch elements 302 and 303 capable of directly controlling ON/OFF of the electrical signal path by an optical signal are arranged on a surface region of the chip substrate 301.

The switch elements 302 and 303 are elements which are turned ON by the light having light intensity of threshold or more, and which are turned OFF by no light or the light having light intensity less than the threshold. For instance, the logic circuit such as flip-flop is constituted by the switch elements 302 and 303.

Structure of the switch elements 302 and 303 is not particularly restricted, and thus any structure may be permitted as long as the switch element can control ON/OFF of the electrical signal path by the optical signal.

A metal wiring region 304 is arranged on the upper surface of the chip substrate 301. The metal wiring region 304 is comprised a plurality of stacked metal layers.

A light shielding layer 305 having a function for shielding light is arranged on the metal wiring region 304. An optical waveguide layer (optical waveguide surface) 306 having a function by which the optical clock is propagated radially in a surface is arranged on the light shielding layer 305.

A reflecting plate 313 for reflecting the optical clock is arranged inside the optical waveguide layer 306. The reflecting plate 313 may be made of any material, such as metallic material reflecting the light as a mirror, as long as the advancing direction of the light can be bent at a right angle by the method of refraction, reflection or the like.

A light shielding layer 307 having a function for shielding light is further arranged on the optical waveguide layer 306.

A light emission hole 308 is arranged between the switch element 302 and the optical waveguide layer 306. The light emission hole 308 is filled with the same material as that of the optical waveguide layer 306, and its periphery is surrounded by the light shielding layer 309.

A light incident hole 310 is bored at approximate center of the light shielding layer 307. A light source 311 is arranged above the light incident hole 310. The light source 311 generates an optical clock A by flickering.

A light shielding layer 320 having a function for shielding light is arranged below a lower surface of the chip substrate 301. An optical waveguide layer (optical waveguide surface) 321 having a function for propagating the optical clock radially in a surface is arranged below the light shielding layer 320.

A reflecting plate 327 reflecting the optical clock is arranged inside the optical waveguide layer 321. The reflecting plate 327 may be made of any material, such as metallic material reflecting the light as a mirror, as long as the advancing direction of the light can be bent at a right angle by the method of refraction, reflection or the like.

A light shielding layer 322 having a function for shielding light is further arranged below the optical waveguide layer 321.

A light emission hole 323 is arranged between the optical waveguide layer 321 and the switch element 303. The light emission hole 323 is filled with the same material as that of the optical waveguide layer 321, and its periphery is surrounded by the light shielding layer 324.

A light incident hole 325 is bored at approximate center of the light shielding layer 322. A light source 326 is arranged below the light incident hole 325. The light source 326 generates an optical clock B by flickering.

The optical clocks A and B are in a complementary relation whose phases are mutually shifted by 180°.

The optical clock A generated by the light source 311, whose advancing direction is bent at a right angle by the reflecting plate 313, advances therefrom radially inside the optical waveguide layer 306 toward the edges of the chip substrate 301. The optical clock is supplied to the switch element 302 via the light emission hole 308.

Further, the optical clock B generated by the light source 326, whose advancing direction is bent at a right angle by the reflecting plate 327, advances therefrom radially inside the optical waveguide layer 321 toward the edges of the chip substrate 301. The optical clock is supplied to the switch element 303 via the light emission hole 323.

Figure 23:
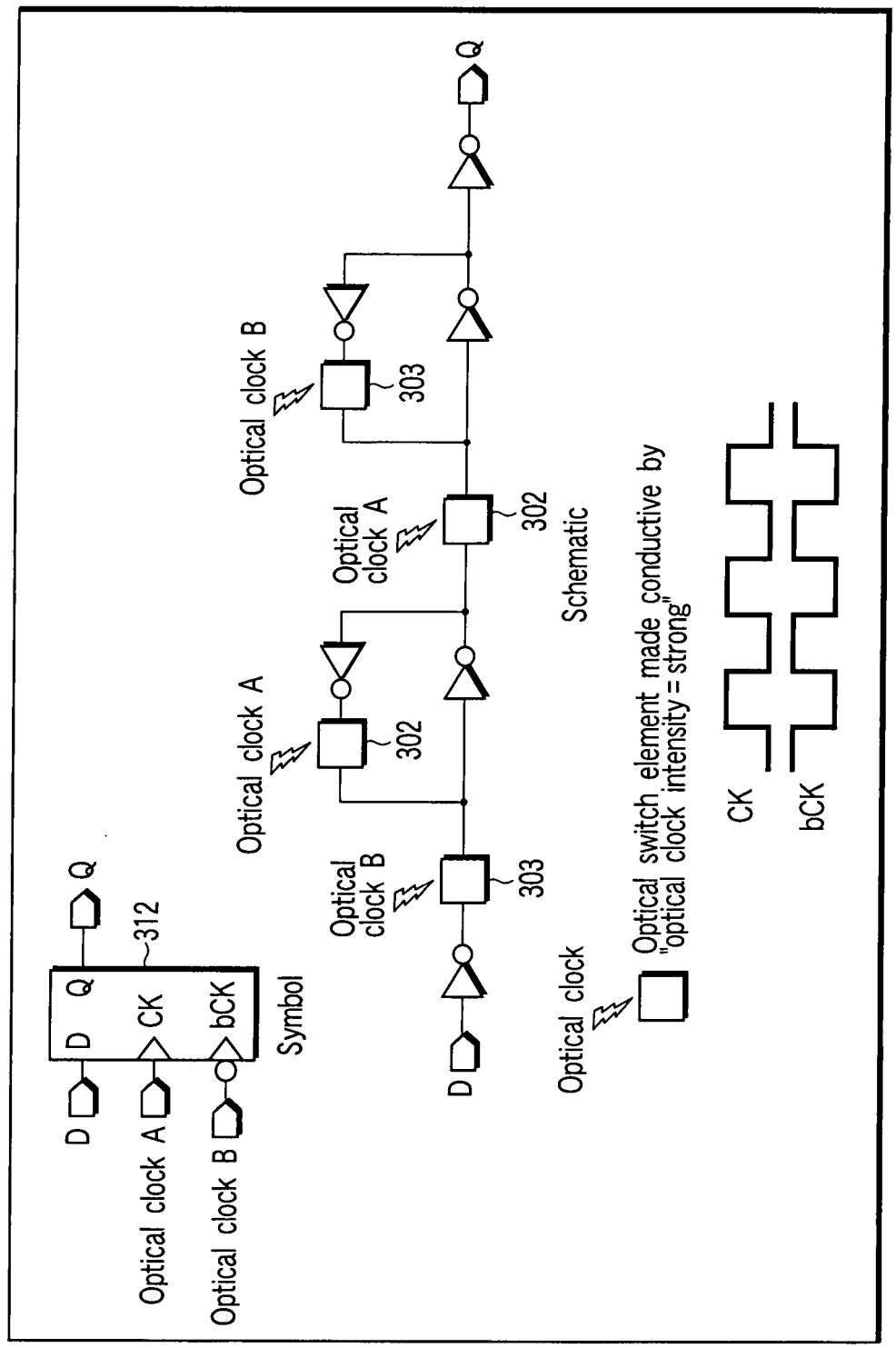
FIG. 23 is a circuit diagram showing the optical gating flip-flop.

FIG. 23 shows a circuit diagram of the flip-flop.

The optical gated flip-flop 312 is comprised a CMOS inverter and an optical switch element. The optical clocks A and B are directly inputted to the clock terminal of the flip-flop 312.

When the light intensity (optical clock intensity) of the optical clock B (bCK) is a value (=strong) exceeding the threshold, the data is captured in the flip-flop 312 from the D input terminal, a D input terminal value at the moment when the light intensity of the optical clock A (CK) becomes a value (=strong) exceeding the threshold is kept in the flip-flop 312, and the value is outputted from the Q output terminal.

The Q output terminal value is then kept until the light intensity of the optical clock A (CK) changes to a value (=strong) exceeding the threshold again.

Thus, when using the switch elements 302 and 303 directly controlled by the optical clock, like the case of FIG. 16, auxiliary effect of remarkably reducing the number of element is obtained.

In the semiconductor integrated circuit of the fourth modified example, it is also possible to obtain the effect of the second embodiment described in the fundamental structure.

G. Fifth Modified Example

Figure 24:
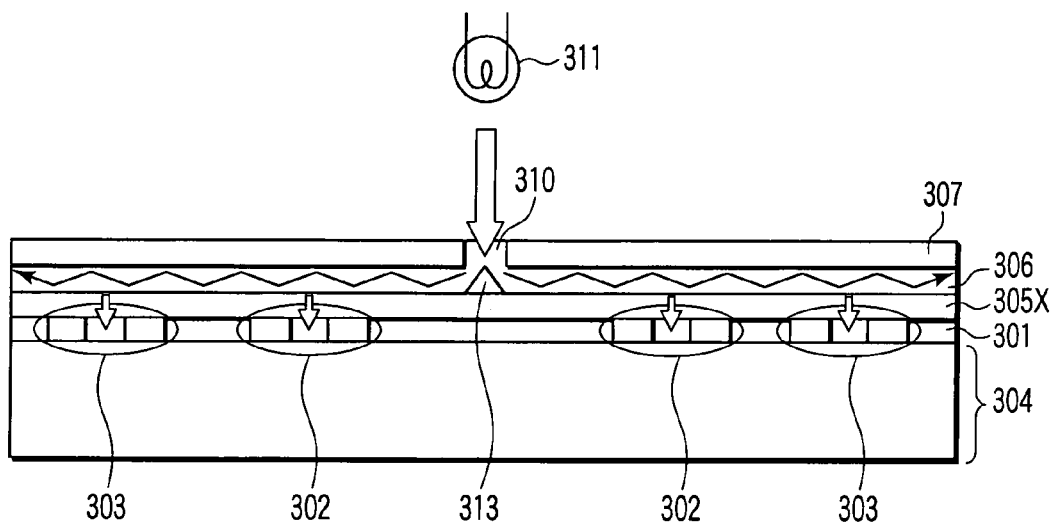
FIG. 24 is a cross sectional view showing a fifth modified example of the second embodiment.

FIG. 24 shows a semiconductor integrated circuit of the fifth modified example.

A difference between the fifth modified example and the fundamental structure lies in a structure in which the optical clock in the optical waveguide layer (optical waveguide surface) 306 is led to the switch elements 302 and 303.

In the fundamental structure, the optical clock in the optical waveguide layer is led to the optical switch element by the light emission hole, but in the fifth modified example, the optical clock is led to the optical switch elements 302 and 303 while utilizing phenomenon in which the light leaks out from a light shielding layer 305X through the light shielding layer 305X by controlling thickness thereof.

Such a light is called "near-field light (evanescent light)".

The switch elements 302 and 303 are arranged on the chip substrate 301. The metal wiring region 304 is arranged on one surface (in the present example, lower surface) side of the chip substrate 301, and the light shielding layer 305X is arranged on the other surface (in the present example, upper surface) side.

The other surface of the chip substrate 301 is a rear surface on which the metal wiring region 304 is not formed, and the rear surface is subjected to grinding or polishing, after which a sufficiently thin light shielding layer 305X is formed thereon.

The optical waveguide layer 306 is arranged on the light shielding layer 305X. The reflecting plate 313 is arranged inside the optical waveguide layer 306. Further, the light shielding layer 307 is arranged on the optical waveguide layer 306.

A light incident hole 310 is bored at approximate center of the light shielding layer 307. A light source 311 is arranged above the light incident hole 310.

The optical clock generated from the light source 311, whose advancing direction is bent at a right angle by the reflecting plate 313, advances therefrom radially inside the optical waveguide layer 306 toward the edges of the chip substrate 301.

The optical clock advances radially inside the optical waveguide layer 306, and leaks out from the light shielding layer 305X, to be supplied to the switch elements 302 and 303. The switch elements 302 and 303 constitute the logic circuit such as flip-flop, and the ON/OFF thereof is directly controlled by the optical clock.

According to the fifth modified example, by utilizing the near-field light while controlling thickness of the light shielding layer 305X, it becomes possible to directly lead the optical clock to the switch element without boring the light emission hole purposely.

Therefore, the device structure and the process are simplified, so that manufacturing cost can be reduced.

In the semiconductor integrated circuit of the fifth modified example, it is also possible to obtain the effect of the second embodiment described in the fundamental structure.

H. Sixth Modified Example

Figure 25:
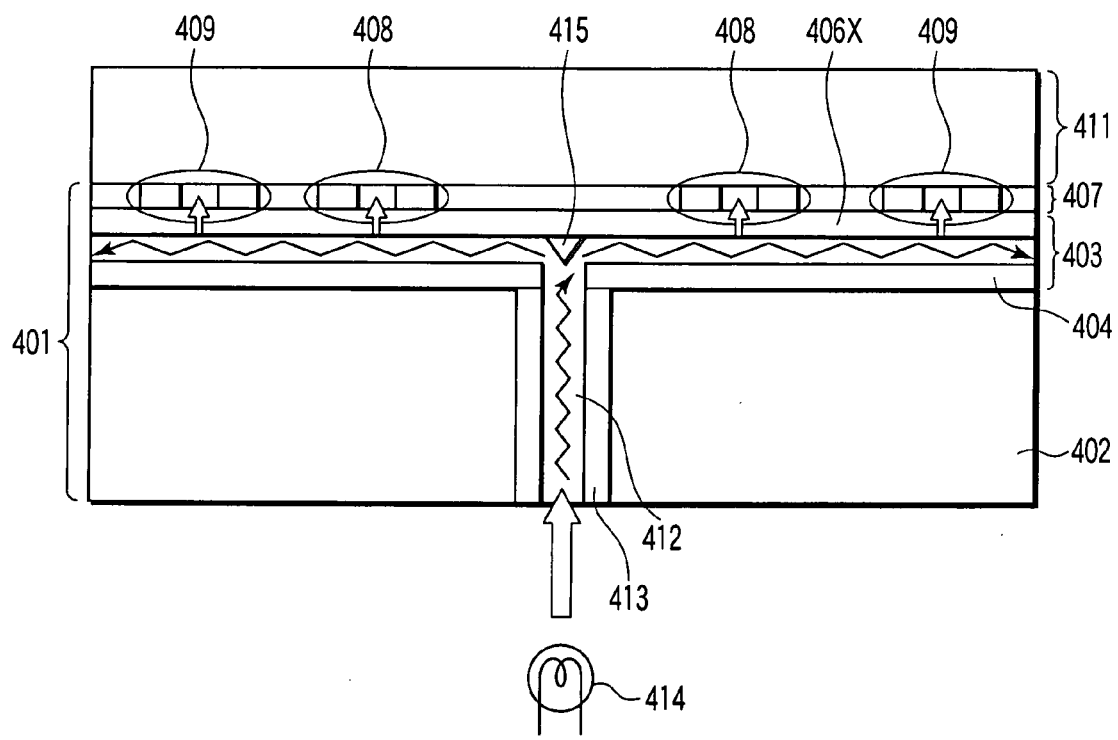
FIG. 25 is a cross sectional view showing a sixth modified example of the second embodiment.

FIG. 25 shows a semiconductor integrated circuit of the sixth modified example.

The sixth modified example is different from the fundamental structure in two points: firstly, the SOI chip is used, and secondly, the near-field light is utilized. That is, the sixth embodiment may be a combination of the third modified example and the fifth modified example.

The SOI chip substrate 401 is comprised a semiconductor substrate 402, a silicon layer 407 and an insulating layer 403 interposed between the semiconductor substrate 402 and the silicon layer 407.

The insulating layer 402 is comprised light shielding layers 404 and 406X, and an optical waveguide layer (optical waveguide surface) 405 interposed between the light shielding layers 404 and 406X. The light shielding layers 404 has a function for almost completely shielding the light, but the light shielding layer 406X is formed to be sufficiently thin to the degree that part of the light leaks out. The optical waveguide layer 405 has a function for propagating radially the optical clock in a surface.

The reflecting plate 415 reflecting the optical clock is arranged inside the optical waveguide layer 405. The reflecting plate 415 may be made of any material, such as metallic material reflecting the light as a mirror, as long as the advancing direction of the light can be bent at a right angle by the method of refraction, reflection or the like.

The switch elements 408 and 409 capable of directly controlling ON/OFF of the electrical signal path by the optical signal are arranged in the silicon layer 407.

For instance, in the case where two kinds of strong and weak light intensities are prepared, the switch element 408 is an element which is turned ON when the light intensity is strong, and is turned OFF when the light intensity is weak, while the switch element 409 is an element which is turned ON when the light intensity is weak, and is turned OFF when the light intensity is strong.

For instance, the logic circuit such as flip-flop is constituted by the switch elements 408 and 409.

Structure of the switch elements 408 and 409 is not particularly restricted, and thus any structure may be permitted as long as the switch element can control ON/OFF of the electrical signal path by the optical signal.

A metal wiring region 411 is arranged on the silicon layer 407. The metal wiring region 411 is comprised a plurality of stacked metal layers.

The light incident hole 412 reaching the optical waveguide layer 405 is bored in the semiconductor substrate 402. The light incident hole 412 is filled with the same material as that of the optical waveguide layer 405, and its periphery is surrounded by the light shielding layer 413.

The light shielding layers 404, 406X and 413 are constituted from materials having lower refractive index than materials constituting the optical waveguide layer 405, materials such as metals reflecting the optical clock, or the same material as that of the reflecting plate 415.

The light source 414 is arranged below the light incident hole 412. The light source 414 expresses "H"/"L" of the clock by flickering.

The optical clock made incident from the light incident hole 412, whose advancing direction is bent at a right angle by the reflecting plate 415, advances therefrom radially inside the optical waveguide layer 405 toward the edges of the SOI chip substrate 401.

The optical clock is directly supplied to the switch elements 408 and 409 because the optical clock advances radially inside the optical waveguide layer 405 and leaks out from the light shielding layer 406X.

The switch elements 408 and 409 are directly turned ON/OFF based on the light intensity (strong/weak) of the optical clock, and accordingly operation of the logic circuit such as flip-flop is directly controlled by the optical clock.

In the semiconductor integrated circuit of the sixth modified example, it is also possible to obtain the effect of the second embodiment described in the fundamental structure.

I. Summary

According to the second embodiment, it is possible to substantially reduce the timing skew at the respective portions on the chip of the signal by making the best of a feature of ultrahigh speed of the light by using the switch element capable of directly controlling ON/OFF of the electrical signal path by the optical signal.

Therefore, if the products are manufactured in the same process, compared with existing products, it is possible to operate the semiconductor integrated circuit with higher frequency.

Further, since it is not necessary to provide the photoelectric conversion element, or the local conductive line for leading the electrical clock to the logic circuit, it is possible to obtain the effect of simplification of the chip layout, reduction of the chip area and decrease in the power consumption.

3. OTHERS

According to the example of the present invention, it is possible to substantially reduce the timing skew at the respective portions on the chip of the signal transmitted using the optical waveguide surface, and further it is possible to directly lead the signal transmitted by the light to the element.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor integrated circuit comprising:
a chip substrate;
first and second switches arranged on the chip substrate in which ON/OFF of an electrical signal path is directly controlled by an optical signal;
a first light shielding layer arranged above the chip substrate;
an optical waveguide layer arranged on the first light shielding layer;
a second light shielding layer arranged on the optical waveguide layer; and
a reflecting plate arranged in the optical waveguide layer to change an advancing direction of the optical signal,
wherein the optical signal is leaded to the first and second switches from an inside of the optical waveguide layer, and wherein the first and second light shielding layers reflect the optical signal, and the optical waveguide layer transmits the optical signal radially.

2. The semiconductor integrated circuit according to claim 1, wherein the first switch is turned ON when the optical signal has a first intensity, the second switch is turned ON when the optical signal has a second intensity different from the first intensity, and a light incident hole which captures the optical signal into the second light shielding layer is provided.

3. The semiconductor integrated circuit according to claim 1, wherein the first switch is turned ON when the optical signal has a first intensity, the second switch is turned ON when the optical signal has a second intensity different from the first intensity, and the optical signal is emitted toward the optical waveguide layer from an element on the chip substrate.

4. The semiconductor integrated circuit according to claim 1, wherein the first switch is turned ON when the optical signal has a first intensity, the second switch is turned ON when the optical signal has a second intensity different from the first intensity, and optical signal is emitted toward the optical waveguide layer from an outside of a light incident hole provided on the chip substrate.

5. The semiconductor integrated circuit according to claim 1, further comprising
a light emission hole which is provided on the first light shielding layer, wherein the optical signal is leaded to the first and second switches from the light emission hole.

6. The semiconductor integrated circuit according to claim 1, wherein the optical signal is leaded to the first and second switches from the first light shielding layer based on a phenomenon in which the optical signal leaks out from the first light shielding layer due to a thickness of the first light shielding layer.

7. A semiconductor integrated circuit comprising:
a semiconductor substrate;
an SOI chip substrate having an insulating layer and a silicon layer; and
first and second switches arranged in the silicon layer in which ON/OFF of an electrical signal path is directly controlled by an optical signal,
the insulating layer comprising:
first and second light shielding layers;
an optical waveguide layer arranged between the first and second light shielding layers; and
a reflecting plate arranged inside the optical waveguide layer to change an advancing direction of the optical signal,
wherein the optical signal is leaded to the first and second switches from an inside of the optical waveguide layer, and
wherein the first and second light shielding layers reflect the optical signal, and the optical waveguide layer transmits the optical signal radially.

8. The semiconductor integrated circuit according to claim 7, wherein the first switch is turned ON when the optical signal has first intensity, and the second switch is turned ON when the optical signal has a second intensity different from the first intensity.

9. The semiconductor integrated circuit according to claim 7, further comprising
a light emission hole which is provided on the first light shielding layer, wherein the optical signal is leaded to the first and second switches from the light emission hole.

10. The semiconductor integrated circuit according to claim 7, wherein the optical signal is leaded to the first and second switches from the first light shielding layer based on a phenomenon in which the optical signal leaks out from the first light shielding layer due to a thickness of the first light shielding layer.

11. A semiconductor integrated circuit comprising:
a chip substrate;
first and second switches arranged on the chip substrate in which ON/OFF of an electrical signal path is directly controlled by first and second optical signals;
first and second light shielding layers arranged above the chip substrate;
a first optical waveguide layer arranged between the first and second light shielding layers;
a first reflecting plate arranged inside the first optical waveguide layer to change an advancing direction of the first optical signal;
third and fourth light shielding layers arranged below the chip substrate;
a second waveguide layer arranged between the third and fourth light shielding layers; and
a second reflecting plate arranged inside the second optical waveguide layer to change an advancing direction of the second optical signal,
wherein the first optical signal is leaded to the first switch from an inside of the first optical waveguide layer,
wherein the second optical signal is leaded to the second switch from an inside of the second optical waveguide layer, and
wherein phases of the first and second optical signals are in a complementary relation.

12. The semiconductor integrated circuit according to claim 11, wherein intensity of the first optical signal is equal to intensity of the second optical signal.

13. The semiconductor integrated circuit according to claim 11, further comprising
a first light emission hole which is provided on the first light shielding layer, wherein the first optical signal is leaded to the first switch from the first light emission hole; and
a second light emission hole which is provided on the third light shielding layer, wherein the second optical signal is leaded to the second switch from the second light emission hole.

14. The semiconductor integrated circuit according to claim 11, wherein the first optical signal is leaded to the first switch from the first light shielding layer and leaded to the second switch from the second light shielding layer, based on a phenomenon in which the first and second optical signals leak out from the first and second light shielding layers due to a thickness of the first and second light shielding layers respectively.

* * * * *